US012670661B2

(12) United States Patent
Wang et al.

(10) Patent No.: US 12,670,661 B2
(45) Date of Patent: Jun. 30, 2026

(54) Z-CLIPPING FOR PRIMITIVE SAMPLES

(71) Applicant: QUALCOMM Incorporated, San Diego, CA (US)

(72) Inventors: Tao Wang, Sunnyvale, CA (US); Xiayang Zhao, San Diego, CA (US); Huaibing Zhu, San Diego, CA (US); Ruohong Zhou, Sunnyvale, CA (US); Jian Liang, San Diego, CA (US); Junmei Shao, San Diego, CA (US); Qinyu Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 18/465,103

(22) Filed: Sep. 11, 2023

(65) Prior Publication Data

US 2025/0086882 A1       Mar. 13, 2025

(51) Int. Cl.
 *G06T 15/30*       (2011.01)
 *G06T 7/62*        (2017.01)
(52) U.S. Cl.
 CPC ............... *G06T 15/30* (2013.01); *G06T 7/62* (2017.01)
(58) Field of Classification Search
 None
 See application file for complete search history.

(56) References Cited

U.S. PATENT DOCUMENTS

| | | | | |
|---|---|---|---|---|
| 2008/0094412 A1* | 4/2008 | Jiao | ......................... | G06T 15/30 |
| | | | | 345/621 |
| 2010/0295851 A1* | 11/2010 | Diamand | .............. | G06T 15/405 |
| | | | | 345/422 |
| 2015/0161814 A1* | 6/2015 | Engh-Halstvedt | ...... | G06T 15/30 |
| | | | | 345/420 |
| 2021/0383600 A1* | 12/2021 | Uhrenholt | ............... | G06T 11/40 |
| 2022/0319111 A1* | 10/2022 | Uhrenholt | ............. | G06T 15/005 |

OTHER PUBLICATIONS

International Search Report and Written Opinion—PCT/US2024/042098—ISA/EPO—Oct. 20, 2024.

* cited by examiner

*Primary Examiner* — Nurun Flora
(74) *Attorney, Agent, or Firm* — Procopio, Cory, Hargreaves & Savitch LLP

(57)       ABSTRACT

Aspects presented herein relate to methods and devices for graphics processing including an apparatus, e.g., GPU. The apparatus may obtain an indication of a set of primitives for a draw call operation. The apparatus may also identify a subset of primitives in the set of primitives, each of the subset of primitives including a primitive portion that is outside of a viewing frustum for the draw call operation, and the primitive portion corresponding to less than all of each of the subset of primitives. Further, the apparatus may calculate an area of each of the subset of primitives including the primitive portion that is outside of the viewing frustum. The apparatus may also perform, or refrain from performing, a clipping operation for each of the subset of primitives based on the area of each of the subset of primitives being less than or greater than an area threshold.

29 Claims, 12 Drawing Sheets

300

302

200

Portion of Primitive 820 within Viewing Frustum 810

Portion of Primitive 820 outside of Viewing Frustum 810

Primitive 820

Viewing Frustum 810

800

Portion of Primitive 920/922 within Viewing Frustum 910

Portion of Primitive 920/922 outside of Viewing Frustum 910

Primitive 920

Primitive 922

Viewing Frustum 910

900

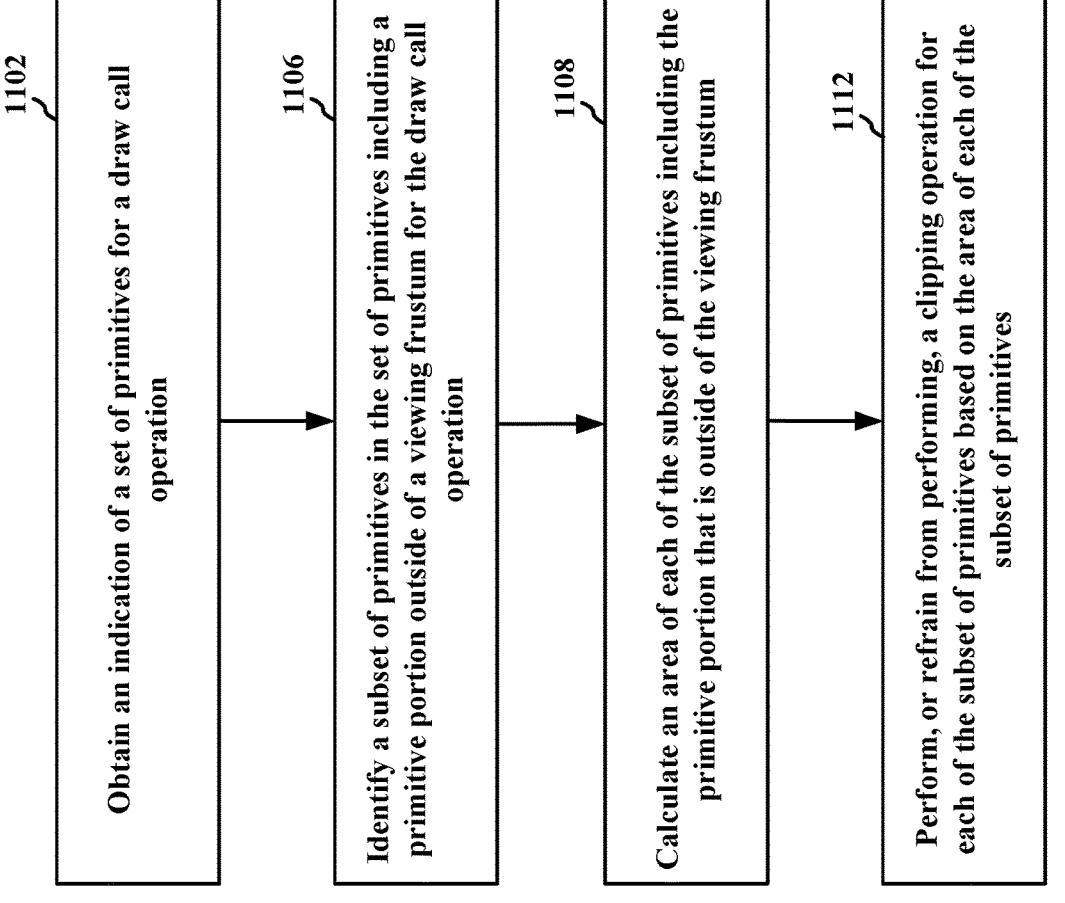

1102

Obtain an indication of a set of primitives for a draw call operation

1106

Identify a subset of primitives in the set of primitives including a primitive portion outside of a viewing frustum for the draw call operation

1108

Calculate an area of each of the subset of primitives including the primitive portion that is outside of the viewing frustum

1112

Perform, or refrain from performing, a clipping operation for each of the subset of primitives based on the area of each of the subset of primitives

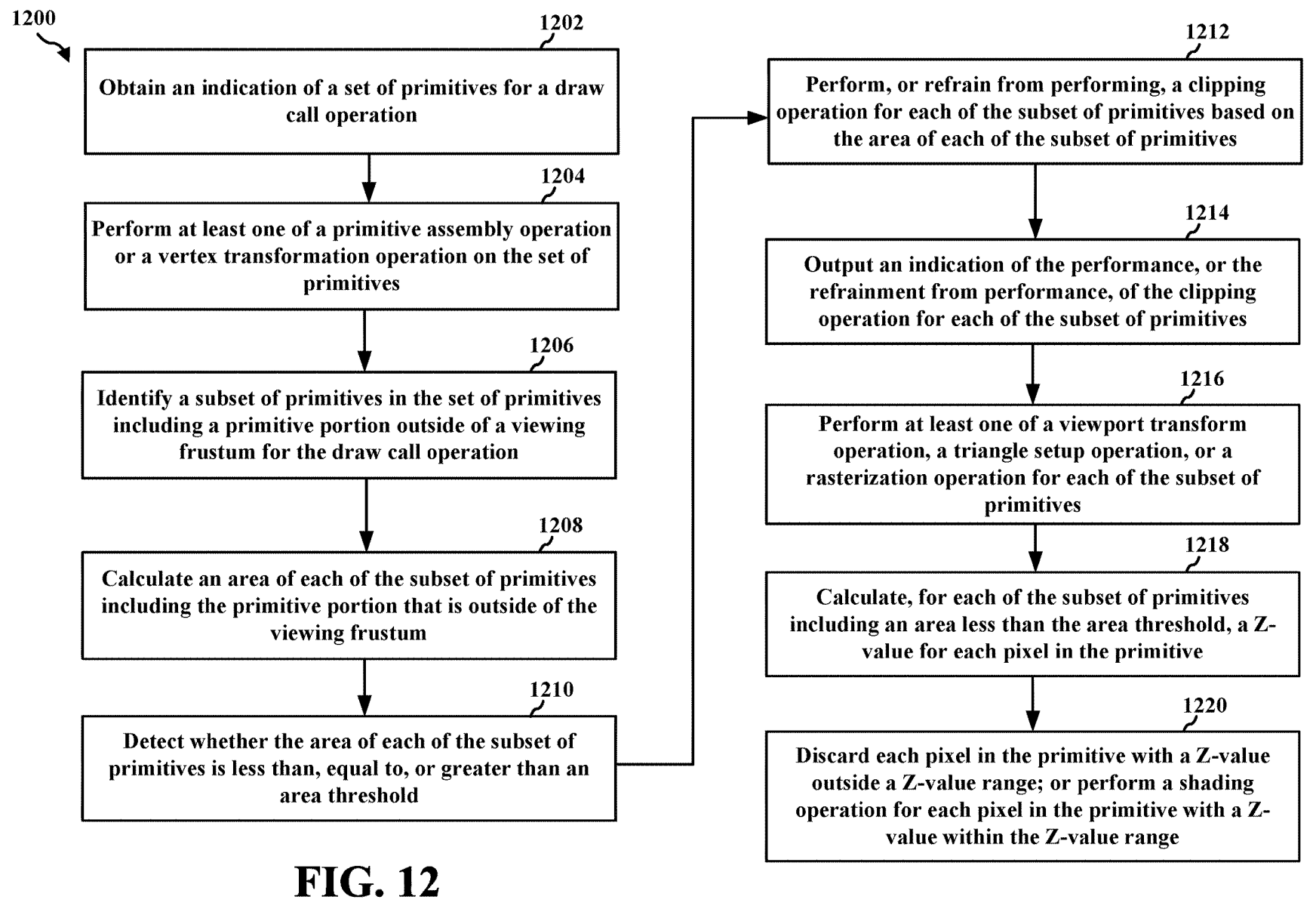

1202
Obtain an indication of a set of primitives for a draw call operation

1204
Perform at least one of a primitive assembly operation or a vertex transformation operation on the set of primitives 1206
Identify a subset of primitives in the set of primitives including a primitive portion outside of a viewing frustum for the draw call operation 1208
Calculate an area of each of the subset of primitives including the primitive portion that is outside of the viewing frustum 1210
Detect whether the area of each of the subset of primitives is less than, equal to, or greater than an area threshold 1212
Perform, or refrain from performing, a clipping operation for each of the subset of primitives based on the area of each of the subset of primitives 1214
Output an indication of the performance, or the refrainment from performance, of the clipping operation for each of the subset of primitives 1216
Perform at least one of a viewport transform operation, a triangle setup operation, or a rasterization operation for each of the subset of primitives 1218
Calculate, for each of the subset of primitives including an area less than the area threshold, a Z-value for each pixel in the primitive 1220
Discard each pixel in the primitive with a Z-value outside a Z-value range; or perform a shading operation for each pixel in the primitive with a Z-value within the Z-value range

FIG. 12

Z-CLIPPING FOR PRIMITIVE SAMPLES

TECHNICAL FIELD

The present disclosure relates generally to processing systems and, more particularly, to one or more techniques for graphics processing applications.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU), a central processing unit (CPU), or any apparatus that may perform graphics processing. The apparatus may obtain an indication of a set of primitives for a draw call operation. The apparatus may also perform at least one of a primitive assembly operation or a vertex transformation operation on the set of primitives for the draw call operation, where an identification of a subset of primitives is based on the performance of at least one of the primitive assembly operation or the vertex transformation operation. The apparatus may also identify a subset of primitives in the set of primitives, where each of the subset of primitives include a primitive portion that is outside of a viewing frustum for the draw call operation, and where the primitive portion corresponds to less than all of each of the subset of primitives. Additionally, the apparatus may calculate an area of each of the subset of primitives including the primitive portion that is outside of the viewing frustum. The apparatus may also detect whether the area of each of the subset of primitives is less than, equal to, or greater than the area threshold, where a performance, or a refrainment from performance, of a clipping operation for each of the subset of primitives is based on the detection. The apparatus may also perform, or refrain from performing, a clipping operation for each of the subset of primitives based on the area of each of the subset of primitives being less than, equal to, or greater than an area threshold. Moreover, the apparatus may output an indication of the performance, or the refrainment from performance, of the clipping operation for each of the subset of primitives. The apparatus may also perform, based on the performance of the clipping operation, at least one of a viewport transform operation, a triangle setup operation, or a rasterization operation for each of the subset of primitives based on the area of each of the subset of primitives being greater than the area threshold. The apparatus may also calculate, for each of the subset of primitives including the area of the primitive that is less than the area threshold, a Z-value for each pixel in the primitive. Further, the apparatus may discard, based on the calculation of the Z-value, each pixel in the primitive including the Z-value that is outside of a Z-value range. The apparatus may also perform, based on the calculation of the Z-value, a shading operation for each pixel in the primitive including the Z-value that is within a Z-value range. The apparatus may also output an indication of the performance of the shading operation for each pixel in the primitive including the Z-value that is within the Z-value range.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 11 is a flowchart of an example method of graphics processing.

FIG. 12 is a flowchart of an example method of graphics processing.

DETAILED DESCRIPTION

Figure 1:
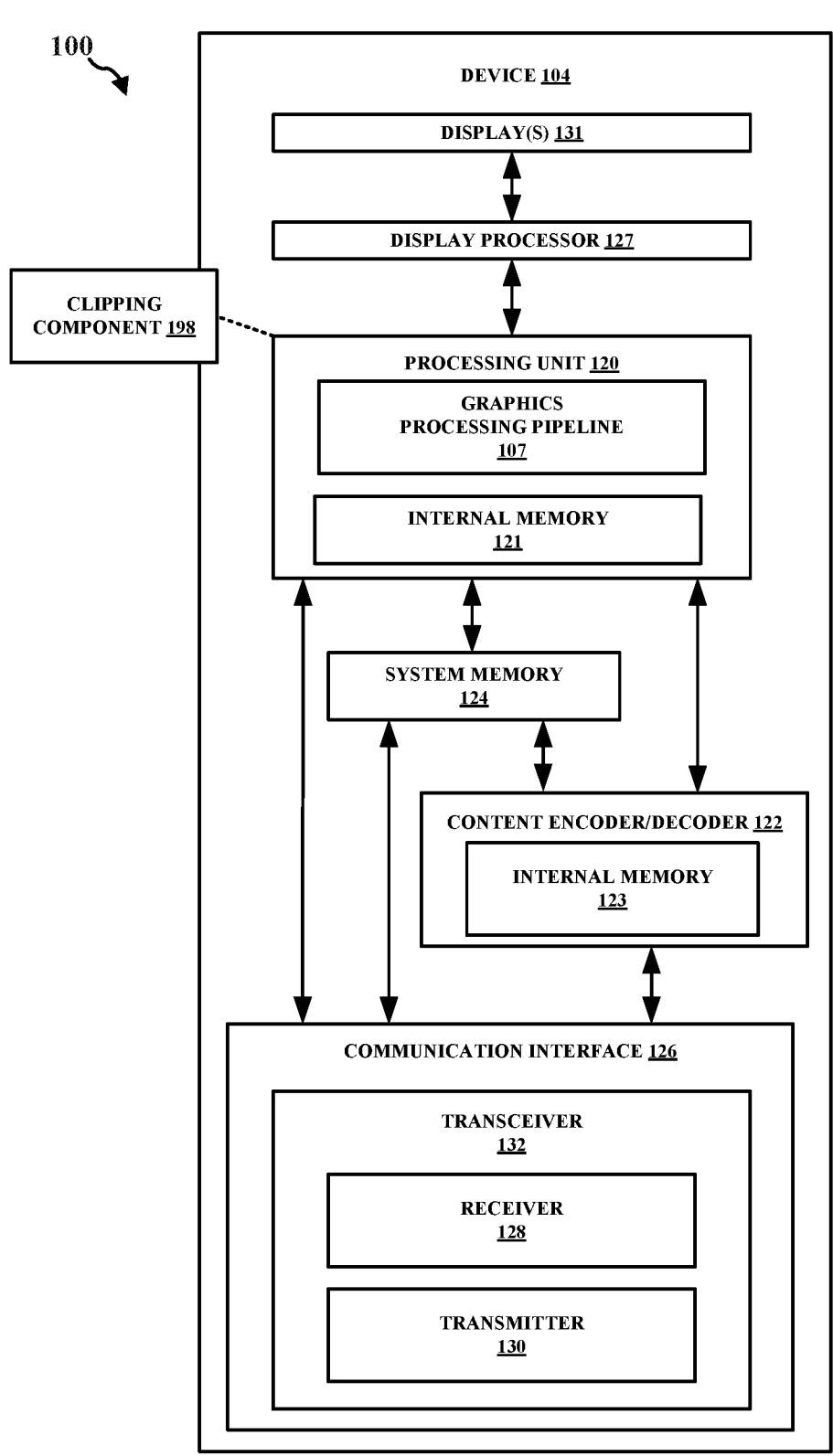
FIG. 1 is a block diagram that illustrates an example content generation system.

In aspects of graphics processing, primitives and triangles may take a large number of processing cycles to complete a clipping operation for the primitive/triangle. For instance, each primitive/triangle may take a certain number of cycles (e.g., over 20 cycles) in order to process for a clipping operation (e.g., a Z-clipping operation). Additionally, clipping operations (e.g., Z-clipping operations) may utilize a high amount of performance and power to complete processing (e.g., performance and power at a GPU). Further, certain types of clipping operations (e.g., Z-clipping operations) may include a large amount of primitives/triangles. For example, certain types of clipping operations (e.g., Z-clipping operations) may be associated with a certain size of primitive/triangle (e.g., a small primitive/triangle that is below a size threshold), which may necessitate processing a large amount of primitives/triangles for the type of clipping operation. In turn, processing a large amount of primitives/triangles may utilize a high amount of performance and power (e.g., performance and power at a GPU) to perform the clipping operation (e.g., a Z-clipping operation). Accordingly, performance and power (e.g., performance and power at a GPU) may be limited by a certain throughput (e.g., a Z clipping throughput). Additionally, some types of applications (e.g., games) may have a high amount of certain clipping operations (e.g., a high amount of Z clipping operations). Further, these types of applications may perform clipping operations (e.g., Z clipping operations) on certain-sized triangles (e.g., a small primitive/triangle that is below a size threshold). As indicated herein, clipping operations utilize a high amount of performance and power (e.g., performance and power at a GPU pipelines), which includes a high amount of serialized steps of calculations. As such, processing a high amount of these clipping workloads (e.g., Z clipping workloads) may slow down the performance (e.g., performance at a GPU). Aspects of the present disclosure may improve power and/or performance issues across a graphics pipeline (e.g., a graphics pipeline at a GPU). For instance, aspects presented herein may reduce an amount of clipping workloads (e.g., at a GPU). For example, aspects of the present disclosure may reduce an amount of Z clipping workloads (e.g., at a GPU). In order to do so, aspects of the present disclosure may selectively process clipping operations for certain-sized primitives/triangles.

Aspects of the present disclosure may include a number of benefits or advantages. For instance, aspects of the present disclosure may improve power and/or performance issues across a graphics pipeline (e.g., a graphics pipeline at a GPU). Aspects presented herein may also reduce an amount of clipping workloads (e.g., at a GPU). That is, aspects of the present disclosure may reduce an amount of Z clipping workloads (e.g., at a GPU). Also, aspects of the present disclosure may selectively process clipping operations for certain-sized primitives/triangles. For example, aspects presented herein may calculate and determine a size of a primitive/triangle in order to perform a clipping operation. Aspects presented herein may also increase performance (e.g., the performance at a GPU) due to clipping operations. Indeed, aspects presented herein may increase the performance of the GPU by performing a clipping operation (e.g., Z-clipping operation) for certain-sized primitives/triangles (e.g., primitives/triangles that are below a threshold size). Further, aspects presented herein may save the amount of processing power at a GPU by performing a clipping operation (e.g., Z-clipping operation) for certain-sized primitives/triangles (e.g., primitives/triangles that are below a threshold size). Aspects presented herein may also obtain a certain frame-level performance increase at the GPU (e.g., a 1%-10% frame-level performance increase).

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a clipping component 198 configured to obtain an indication of a set of primitives for a draw call operation. The clipping component 198 may also be configured to perform at least one of a primitive assembly operation or a vertex transformation operation on the set of primitives for the draw call operation, where an identification of a subset of primitives is based on the performance of at least one of the primitive assembly operation or the vertex transformation operation. The clipping component 198 may also be configured to identify a subset of primitives in the set of primitives, where each of the subset of primitives include a primitive portion that is outside of a viewing frustum for the draw call operation, and where the primitive portion corresponds to less than all of each of the subset of primitives. The clipping component 198 may also be configured to calculate an area of each of the subset of primitives including the primitive portion that is outside of the viewing frustum. The clipping component 198 may also be configured to detect whether the area of each of the subset of primitives is less than, equal to, or greater than the area threshold, where a performance, or a refrainment from performance, of a clipping operation for each of the subset of primitives is based on the detection. The clipping component 198 may also be configured to perform, or refrain from performing, a clipping operation for each of the subset of primitives based on the area of each of the subset of primitives being less than, equal to, or greater than an area threshold. The clipping component 198 may also be configured to output an indication of the performance, or the refrainment from performance, of the clipping operation for each of the subset of primitives. The clipping component 198 may also be configured to perform, based on the performance of the clipping operation, at least one of a viewport transform operation, a triangle setup operation, or a rasterization operation for each of the subset of primitives based on the area of each of the subset of primitives being greater than the area threshold. The clipping component 198 may also be configured to calculate, for each of the subset of primitives including the area of the primitive that is less than the area threshold, a Z-value for each pixel in the primitive. The clipping component 198 may also be configured to discard, based on the calculation of the Z-value, each pixel in the primitive including the Z-value that is outside of a Z-value range. The clipping component 198 may also be configured to perform, based on the calculation of the Z-value, a shading operation for each pixel in the primitive including the Z-value that is within a Z-value range. The clipping component 198 may also be configured to output an indication of the performance of the shading operation for each pixel in the primitive including the Z-value that is within the Z-value range. Although the following description may be focused on display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
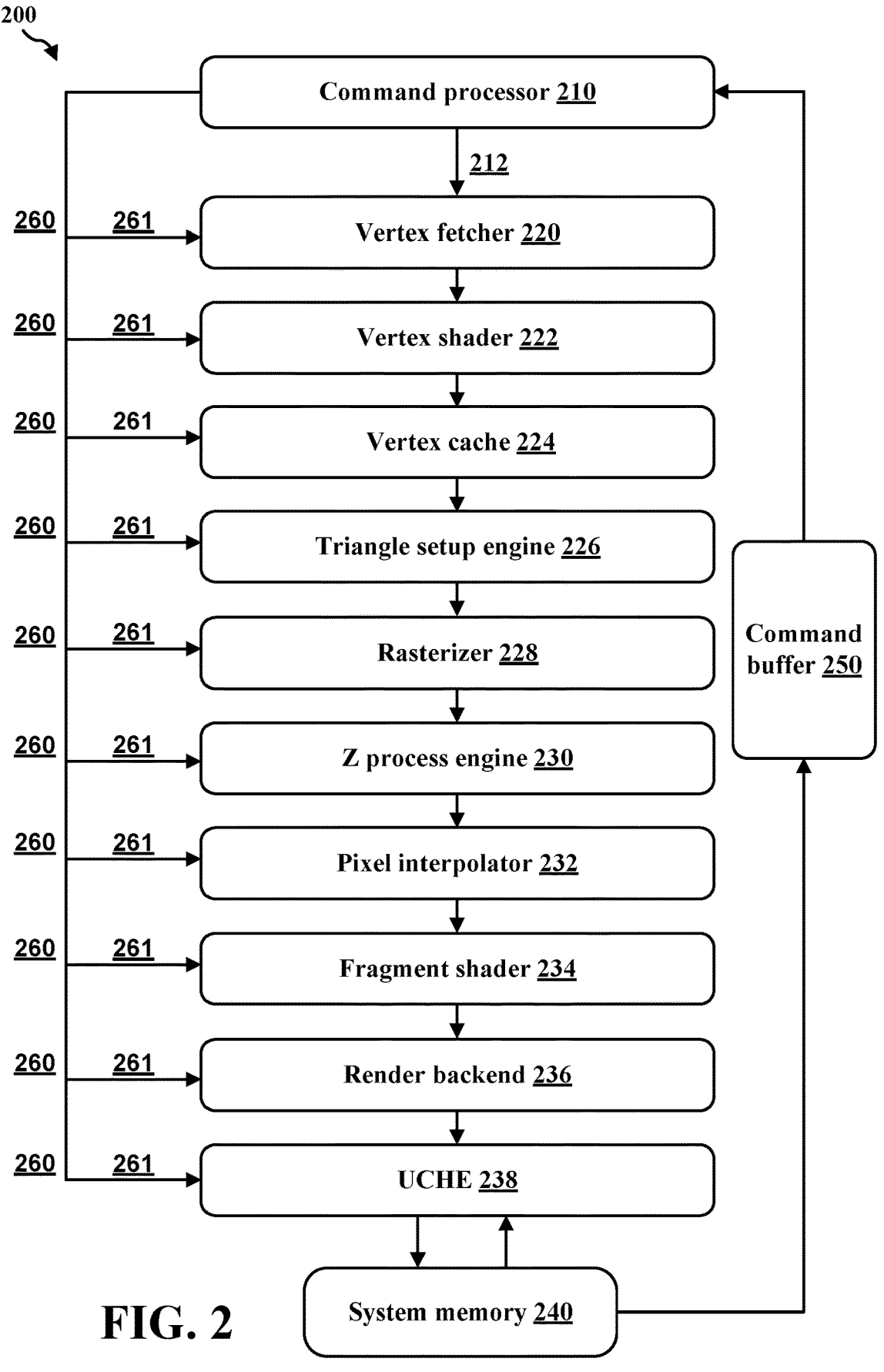
FIG. 2 is a diagram illustrating an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUS according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

In some aspects of tiled rendering, there may be multiple processing phases or passes. For instance, the rendering may be performed in two passes, e.g., a visibility or bin-visibility pass and a rendering or bin-rendering pass. During a visibility pass, a GPU may input a rendering workload, record the positions of the primitives or triangles, and then determine which primitives or triangles fall into which bin or area. In some aspects of a visibility pass, GPUs may also identify or mark the visibility of each primitive or triangle in a visibility stream. During a rendering pass, a GPU may input the visibility stream and process one bin or area at a time. In some aspects, the visibility stream may be analyzed to determine which primitives, or vertices of primitives, are visible or not visible. As such, the primitives, or vertices of primitives, that are visible may be processed. By doing so, GPUs may reduce the unnecessary workload of processing or rendering primitives or triangles that are not visible. In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each of the primitives in each bin or area, e.g., in a system memory. This visibility information may be used to determine or generate a visibility stream. In a rendering pass, the primitives in each bin may be rendered separately. In these instances, the visibility stream may be fetched from memory used to drop primitives which are not visible for that bin.

Some aspects of GPUs or GPU architectures may provide a number of different options for rendering, e.g., software rendering and hardware rendering. In software rendering, a driver or CPU may replicate an entire frame geometry by processing each view one time. Additionally, some different states may be changed depending on the view. As such, in software rendering, the software may replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware may manage the replication or processing of the primitives or triangles for each viewpoint in an image.

Figure 3:
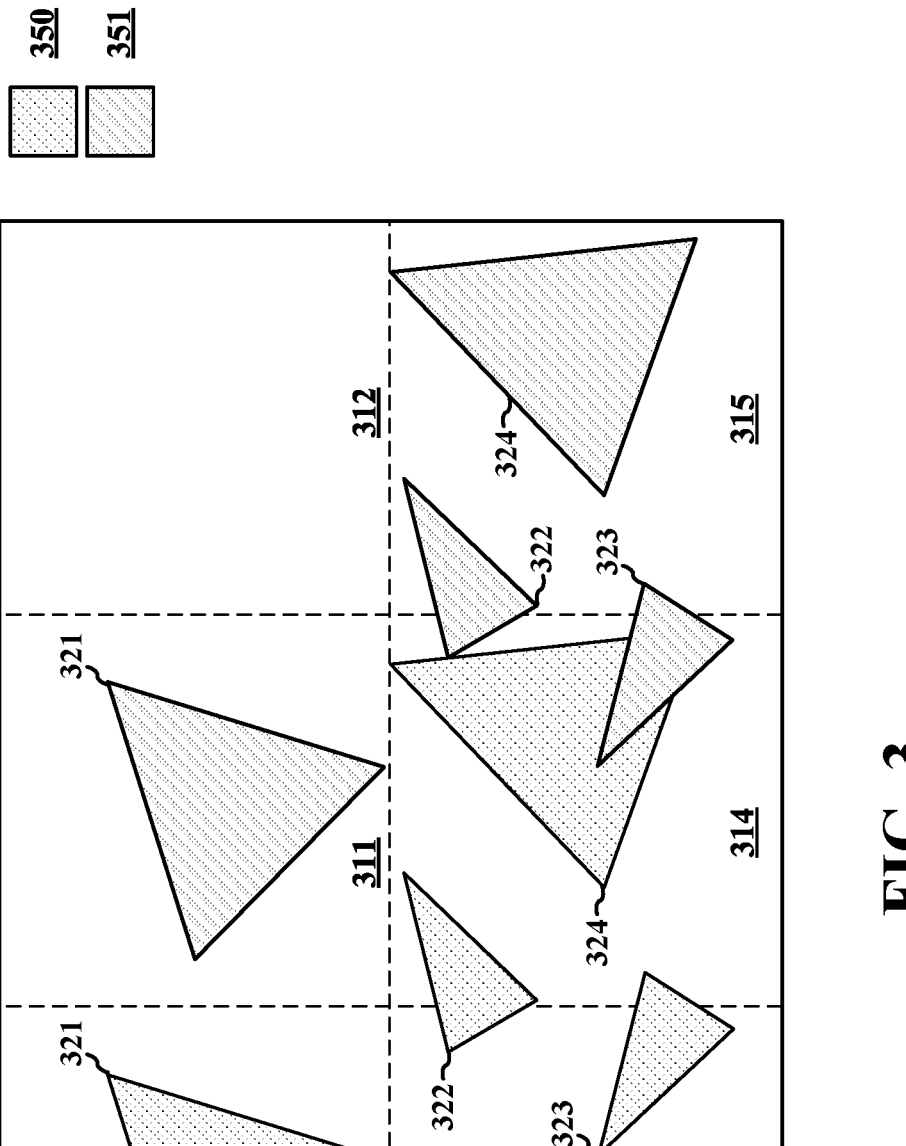
FIG. 3 is a diagram illustrating an example image or surface for graphics processing.

FIG. 3 illustrates image or surface 300, including multiple primitives divided into multiple bins. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 may utilize multiple viewpoints or multiview rendering.

As indicated herein, GPUs or graphics processor units may use a tiled rendering architecture to reduce power consumption or save memory bandwidth. As further stated above, this rendering method may divide the scene into multiple bins, as well as include a visibility pass that identifies the triangles that are visible in each bin. Thus, in tiled rendering, a full screen may be divided into multiple bins or tiles. The scene may then be rendered multiple times, e.g., one or more times for each bin. In aspects of graphics rendering, some graphics applications may render to a single target, i.e., a render target, one or more times. For instance, in graphics rendering, a frame buffer on a system memory may be updated multiple times. The frame buffer may be a portion of memory or random access memory (RAM), e.g., containing a bitmap or storage, to help store display data for a GPU. The frame buffer may also be a memory buffer containing a complete frame of data. Additionally, the frame buffer may be a logic buffer. In some aspects, updating the frame buffer may be performed in bin or tile rendering, where, as discussed above, a surface is divided into multiple bins or tiles and then each bin or tile may be separately rendered. Further, in tiled rendering, the frame buffer may be partitioned into multiple bins or tiles.

In some aspects of graphics processing, rendering may be performed in multiple locations and/or on multiple devices, e.g., in order to divide the rendering workload between different devices. For example, the rendering may be split between a server and a client device, which may be referred to as "split rendering." In some instances, split rendering may be a method for bringing content to user devices or head mounted displays (HMDs), where a portion of the graphics processing may be performed outside of the device or HMD, e.g., at a server. Split rendering may be performed for a number of different types of applications, e.g., virtual reality (VR) applications, augmented reality (AR) applications, and/or extended reality (XR) applications. In VR applications, the content displayed at the user device may correspond to man-made or animated content, e.g., content rendered at a server or user device. In AR or XR content, a portion of the content displayed at the user device may correspond to real-world content, e.g., objects in the real world, and a portion of the content may be man-made or animated content. Also, the man-made or animated content and real-world content may be displayed in an optical see-through or a video see-through device, such that the user may view real-world objects and man-made or animated content simultaneously. In some aspects, man-made or animated content may be referred to as augmented content, or vice versa.

In certain types of graphics processing, e.g., augmented reality (AR) applications, virtual reality (VR) applications, or three-dimensional (3D) games, objects may occlude (i.e., obscure, cover, block, or obstruct) other objects from the vantage point of the user device. There may also be different types of occlusions within AR/VR applications or 3D games. For example, augmented content may occlude real-world content, e.g., a rendered object may partially occlude a real object. Also, real-world content may occlude augmented content, e.g., a real object may partially occlude a rendered object. This overlap of real-world content and augmented content, which produces the aforementioned occlusions, is one reason that augmented content and real-world content may blend so seamlessly within AR. This may also result in augmented content and real-world content occlusions being difficult to resolve, such that the edges of augmented and real-world content may incorrectly overlap.

In some aspects, augmented content or augmentations may be rendered over real-world or see-through content. As such, augmentations may occlude whatever object is behind the augmentation from the vantage point of the user device. For example, pixels without an occlusion material, i.e., a red (R), green (G), blue (B) (RGB) value not equal to (0,0,0), may be rendered to occlude real-world objects. Accordingly, an augmentation with a certain value (e.g., a non-zero value) may occlude real-world objects behind the augmentation. In video see-through systems, the same effect may be achieved by compositing the augmentation layer to the foreground. As such, augmentations may occlude rendered content or real-world content, or vice versa. As indicated above, when utilizing VR/AR systems or 3D games, capturing occlusions accurately may be a challenge. Moreover, this may be especially true for VR/AR systems or 3D games with latency issues. In some aspects, it may be especially difficult to accurately capture augmented content that is occluding other augmented content, or accurately capture a real-world object that is occluding augmented content. An accurate occlusion of augmented content or real-world content and the occluded augmented content may help a user to obtain a more realistic and immersive VR/AR or 3D game experience.

Some aspects of graphics processing may utilize occlusion culling, which is a feature that disables the rendering of objects when they are not currently seen by a camera because they are obscured (i.e., occluded) by other objects. For instance, occlusion culling may remove objects in a scene from the camera rendering workload if the objects are entirely obscured by objects closer to the camera. In some aspects, the occlusion culling process may pass through the scene using a virtual camera to build a hierarchy of potentially visible sets of objects. This data may be used by each camera in the graphics processing application to identify which objects are visible or not visible. Occlusion culling may increase rendering performance (e.g., GPU rendering performance) simply by not rendering objects that are outside the viewing area of the camera, or objects that are hidden by other objects closer to the camera. In one instance, the occlusion culling process may be defined as follows: for a camera view in a scene, given a set of occluders (i.e., objects that are occluding other objects) and a set of occludees (i.e., objects that are being occluded by other objects), the visibility of the occludees may be derived or determined based on the relative location of the occluders. For example, if a wall in a scene is closer to the camera than a set of barrels behind the wall, and there are holes in the wall, the occlusion culling process may determine which barrels are visible through the holes in the wall.

Some types of occlusion culling in graphics processing (e.g., occlusion culling for CPUs or GPUs) may include software occlusion culling. For example, in software occlusion culling, for each occluder and each primitive/triangle in a scene, the primitive/triangle may be rasterized to generate an occluder depth map. Also, for each occluder in the scene, the projected axis-aligned bounding box (AABB) area in the occluder depth map may be determined, as well as the nearest depth value of the occludee. Additionally, the occludee's nearest depth value in the projected AABB region may be determined on the occluder depth map. The occludee may be determined to be visible if its nearest depth value is larger than all depth values inside the AABB area. Otherwise, if the occludee's nearest depth value is not larger than all depth values inside the AABB area, the occludee may be determined to be invisible.

Additionally, there are other types of occlusion culling utilized in graphics processing (e.g., occlusion culling in CPUs or GPUs). For instance, there are types of software occlusion culling utilizing CPU single instruction multiple data (SIMD) components. This SIMD-optimized occlusion culling may correspond to an optimized version of an open-source project. This type of occlusion culling may render depth maps (e.g., an occluder depth map) more accurately and faster (e.g., 2-16 times faster) compared to other types of occlusion culling. SIMD-optimized occlusion culling may also be more accurate compared to GPU hardware occlusion culling (HWOC). For example, mobile chip occlusion culling may achieve zero frame latency throughout the rendering process, while GPU hardware occlusion culling may cause latency issues for at least one frame throughout the rendering process. Additionally, SIMD-optimized occlusion culling may result in a smaller draw call amount compared to other types of occlusion culling.

Figure 4:
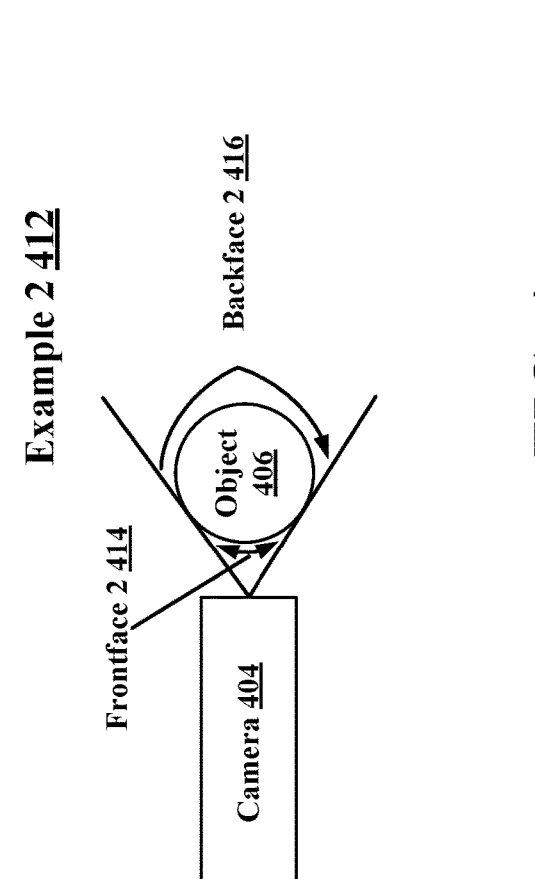
FIG. 4 is a diagram illustrating an example culling process for graphics processing.

FIG. 4 is a diagram 400 illustrating example aspects of a culling process. A back of a solid, opaque object may be hidden from a direct line of sight from an observer. As such, when a scene is rendered on a display, the observer may not be able to see the back of the solid, opaque object. An apparatus (e.g., a GPU) may cull (i.e., remove) primitives (e.g., triangles) associated with the back of the solid, opaque object in order to reduce an amount of scene geometry that is rendered. The aforementioned culling may be referred to as "culling" or "backface culling." Reducing the amount of scene geometry that is rendered may reduce an amount of computations performed by the apparatus.

As shown in FIG. 4, in a first example 402, a lens of a camera 404 may face an object 406. The object 406 may be solid and opaque. A portion of the object 406 that is visible to the camera 404 may be referred to as a frontface of the object 406 (referred to now as "a first frontface 408"). A portion of the object 406 that is not visible to the camera 404 may be referred to as a backface of the object 406 (referred to now as "a first backface 410"). In the first example 402, the camera 404 may be located relatively far away from the object 406 and hence the first backface 410 may be around 50% of a surface of the object 406. An apparatus may perform backface culling on primitives associated with the first backface 410 in order to reduce the amount of scene geometry rendered.

As further shown in FIG. 4, in a second example 412, the lens of the camera 404 may face the object 406 as in the first example 402. However, in the second example 412, the object 406 may be located relatively closer to the camera 404 in comparison to a location of the object 406 and the camera 404 in the first example 402. The object 406 may have a second frontface 414 and a second backface 416. As the object 406 is located closer to the lens of the camera 404 compared to the location of the object 406 and the camera 404 in the first example 402, the second backface 416 may be relatively large. For instance, the second backface 416 may be greater than 50% of the surface of the object 406. An apparatus may perform backface culling on primitives associated with the second backface 416 in order to reduce the amount of scene geometry rendered.

Figure 5:
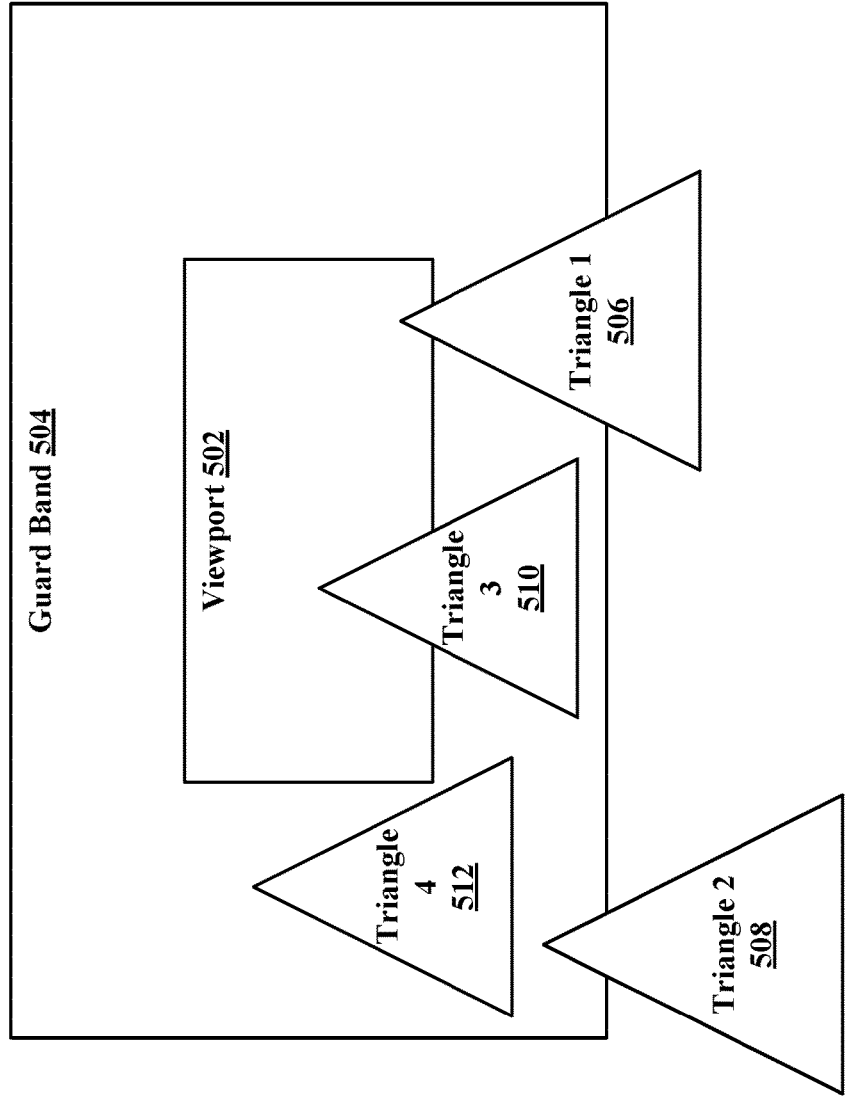
FIG. 5 is a diagram illustrating an example clipping process for graphics processing.
Figure 5:

FIG. 5 is a diagram 500 illustrating example aspects of clipping, such as guard band clipping. "Guard band clipping" may refer to a technique used by an apparatus (e.g., a GPU) to reduce an amount of clipping performed. In guard band clipping, a primitive may be clipped if the primitive extends beyond a guard band, where the guard band is associated with a first region that is larger than a second region associated with a viewport and that encompasses the viewport. In an example, the first region associated with the guard band may be orders of magnitude greater than the second region associated with the viewport. In non-guard band clipping, a primitive may be clipped if the primitive extends beyond the viewport. As used herein, the term "clipping" or "clipping operation" may refer to removing a portion of a primitive (e.g., a triangle) from a rendering process. Guard band clipping may enable the apparatus to accept primitives that are partially or completely off-screen.

As shown in FIG. 5, the diagram 500 depicts a viewport 502 and a guard band 504. In an example, the viewport 502 may be associated with a first area and the guard band 504 may be associated with a second area, where the first area is smaller than the second area. The viewport 502 may be located within the guard band 504. In an example, the viewport 502 may be associated with a resolution of 1920 pixels by 1080 pixels. In an example, a first triangle 506 may include a first portion located in the viewport 502, a second portion located outside of the viewport 502 and within the guard band 504, and a third portion located outside of the guard band 504. In an example, the first triangle 506 may be defined by floating point coordinates (described in greater detail below). An apparatus (e.g., a GPU) may clip the second portion and the third portion as the first triangle 506 extends beyond the guard band 504. Alternatively, the apparatus may clip the third portion. After clipping, the first triangle 506 may be represented by fixed point coordinates (described in greater detail below).

As depicted in FIG. 5, in another example, a second triangle 508 may include a first portion that is within the guard band 504 and a second portion that is outside of the guard band 504. The apparatus may remove the second triangle 508 from a rendering process as the second triangle 508 does not intersect the viewport 502. When removed from the rendering process, the second triangle 508 may not have to undergo clipping and hence computational costs may be reduced. Alternatively, the apparatus may clip the second portion of the second triangle 508. In yet another example, a third triangle 510 may include a first portion that is within the viewport 502 and a second portion that is within the guard band 504. As the third triangle 510 does not extend beyond the guard band 504, the apparatus may accept the third triangle 510 and the apparatus may avoid performing clipping on the third triangle 510. In a further example, a fourth triangle 512 may be within the guard band 504 and the fourth triangle 512 may not intersect the viewport 502. The apparatus may remove the fourth triangle 512 from a rendering process as the fourth triangle 512 does not intersect the viewport 502. When removed from the rendering process, the fourth triangle 512 may not have to undergo clipping and hence computational costs may be reduced.

In some aspects, prior to a clipping operation, a graphics processor or GPU may perform primitive assembly, which is the process of grouping of vertices into lines and triangles. Once primitives have been constructed from their individual vertices, they may be clipped against a displayable region (i.e., the window or screen), which may also be a smaller area known as the viewport. The portions of the primitive that are determined to be potentially visible may be sent to a rasterizer or rasterization block. The rasterization block may determine which pixels are covered by the primitive (e.g., a point, line, or triangle) and then sends the list of pixels to a next stage in the pipeline (e.g., fragment shading).

In some aspects of graphics processing, clipping may be performed to selectively enable or disable rendering operations within a certain range of interest (e.g., a viewing frustum). The "view frustum" or "viewing frustum" may be the region of space in a modeled world that may appear on the screen; such as the field of view of a perspective virtual camera system. For example, a box surrounding a viewing plane and virtual space may represent the viewing frustum or view frustum. For instance, rendering may be performed on pixels at the intersection between the defined clipping area and the scene, while pixels/areas outside of the visible area (e.g., viewing frustum) may be removed from the rendering calculation. As the clipping process may reduce the amount of rendering performed (e.g., rendering at a GPU), clipping may help to improve rendering performance (e.g., at a GPU). Further, a clipping process that is well-defined may allow the rendering component (e.g., a GPU) to reduce processing time and energy by skipping rendering calculations that fall outside of the visible area (e.g., viewing frustum). In some instances, clipping may occur in a Cartesian space (i.e., with Cartesian coordinates).

Additionally, in some aspects of graphics processing (e.g., three-dimensional (3D) graphics), clipping and culling may be used to describe many related features. For example, "clipping" may refer to operations in the plane that work with certain shapes (e.g., rectangular shapes), while "culling" may refer to more general methods of selectively processing elements within a scene model. In some instances, elements of a scene model may include certain geometric primitives (e.g., points/nodes, line segments/edges, polygons/faces). A "primitive" may refer to a graphics object that is utilized for the creation or construction of complex images, such as a shape (e.g., a triangle). In some types of scene models, individual elements can be deactivated (truncated) for reasons of visibility within the viewport or viewing section (e.g., backface culling, occlusion culling, depth clipping or Z-clipping, etc.). There may be different types of algorithms performed at a GPU in order to detect and perform such clipping operations. Further, in some aspects, clipping may be performed by determining which side of each of a plane (e.g., a plane in the viewing frustum) the vertices of each primitive lie. For example, if a primitive's vertices are all on the "outside" of any one plane (e.g., a plane in the viewing frustum), then the entire primitive may be discarded. If all of primitive's vertices are all on the "inside" of all the planes (and thus entirely inside the viewing frustum or view volume), then the primitive may be passed through unaltered. Primitives that are partially visible (i.e., they cross one of the planes in the viewing frustum) may be handled on an individual basis according to the functionality of the GPU.

In depth clipping or Z-clipping (or Z clipping), the "Z" direction may refer to the depth axis in the coordinate system, which is centered on a viewport origin within the viewing frustum. For instance, the "Z" direction may be used interchangeably with "depth" and may correspond to the distance "into the virtual screen" from the viewport origin. Also, in this coordinate system, "X" and "Y" may refer to a conventional Cartesian coordinate system located on the user's screen or the viewport. In some instances, the viewport may also be defined by the geometry of the field of view (FoV). Additionally, Z-clipping or depth clipping may refer to techniques for selectively rendering certain scene objects based on their depth (or Z-axis) relative to the screen. Further, a near clipping depth and a far clipping depth may be specified relative to the screen, such that the portions of objects between these two specified depths may be displayed.

Figure 6:
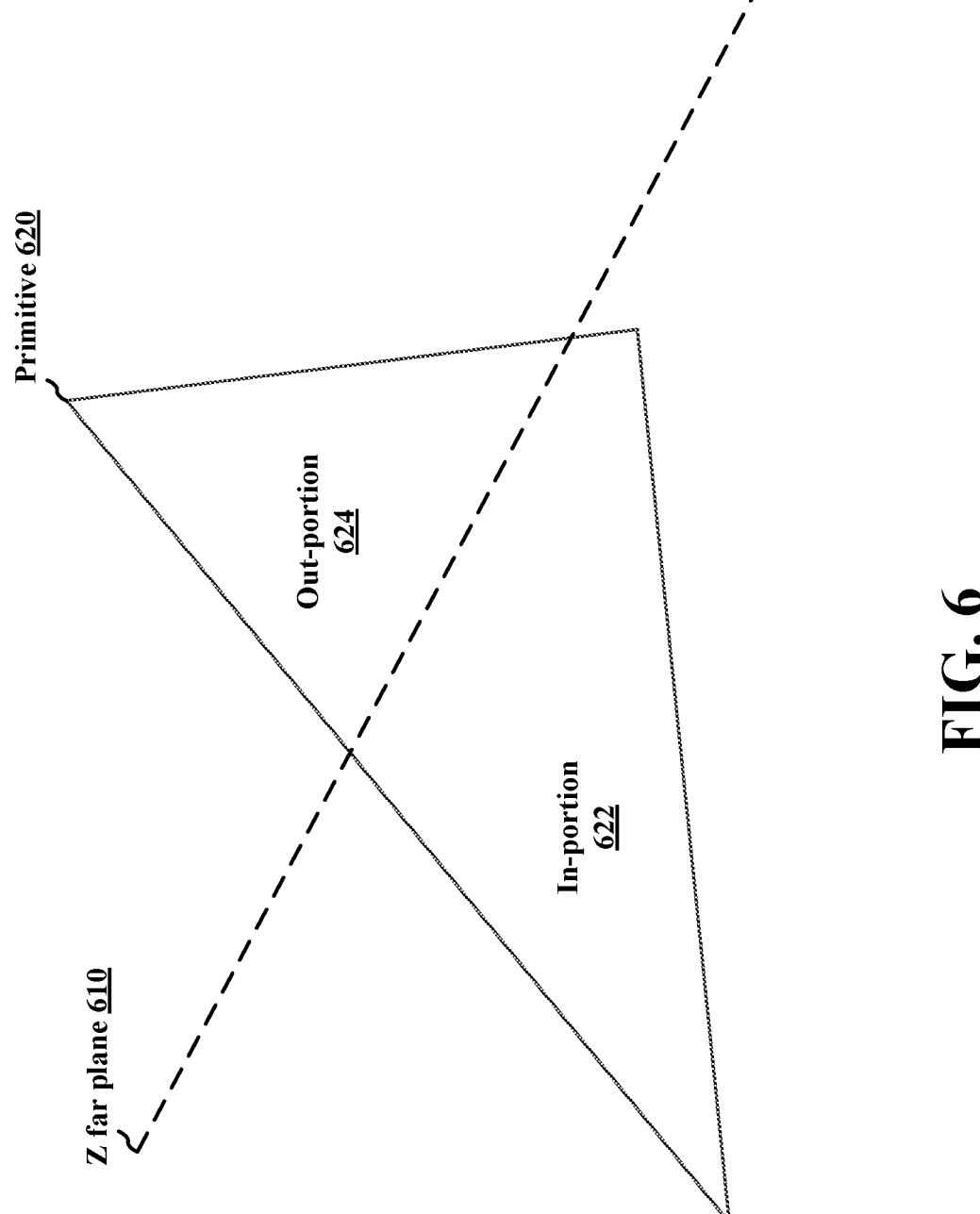
FIG. 6 is a diagram illustrating an example primitive clipping operation.

FIG. 6 is a diagram 600 illustrating an example primitive clipping operation. More specifically, diagram 600 depicts a clipping operation performed on a primitive in a Z-direction (i.e., Z clipping). As shown in FIG. 6, diagram 600 includes Z far plane 610 and primitive 620 including in-portion 622 and out-portion 624. FIG. 6 depicts that primitive 620 is divided in the Z direction by Z far plane 610, which produces in-portion 622 (i.e., the portion of primitive 620 that is within the viewing frustum) and out-portion 624 (i.e., the portion of primitive 620 that is outside of the viewing frustum). For instance, in-portion 622 depicts the primitive portion and vertices of primitive 620 that are within the Z far plane 610 (e.g., a plane in a Z direction in the viewing frustum). Likewise, out-portion 624 depicts the primitive portion and vertices of primitive 620 that are outside of the Z far plane 610 (e.g., a plane in a Z direction in the viewing frustum). As indicated herein, if a primitive's vertices (e.g., vertices of primitive 620) are all outside of any one plane (e.g., Z far plane 610), then the entire primitive may be discarded. Further, if all of primitive's vertices (e.g., vertices of primitive 620) are within all the planes (e.g., Z far plane 610 thus entirely inside the viewing frustum or view volume), then the primitive may be passed through unaltered. As shown in FIG. 6, primitives that are partially visible (i.e., they are bisected by Z far plane), such as primitive 620, may be handled on an individual basis. For example, the vertices or pixels corresponding to in-portion 622 of primitive 620 may be retained, while the vertices or pixels corresponding to out-portion 624 of primitive 620 may be discarded.

In aspects of graphics processing, primitives and triangles may take a large number of processing cycles to complete a clipping operation for the primitive/triangle. For instance, each primitive/triangle may take a certain number of cycles (e.g., over 20 cycles) in order to process for a clipping operation (e.g., a Z-clipping operation). Additionally, clipping operations (e.g., Z-clipping operations) may utilize a high amount of performance and power to complete processing (e.g., performance and power at a GPU). Further, certain types of clipping operations (e.g., Z-clipping operations) may include a large amount of primitives/triangles. For example, certain types of clipping operations (e.g., Z-clipping operations) may be associated with a certain size of primitive/triangle (e.g., a small primitive/triangle that is below a size threshold), which may necessitate processing a large amount of primitives/triangles for the type of clipping operation. In turn, processing a large amount of primitives/triangles may utilize a high amount of performance and power (e.g., performance and power at a GPU) to perform the clipping operation (e.g., a Z-clipping operation). Accordingly, performance and power (e.g., performance and power at a GPU) may be limited by a certain throughput (e.g., a Z clipping throughput).

Additionally, some types of applications (e.g., games) may have a high amount of certain clipping operations (e.g., a high amount of Z clipping operations). Further, these types of applications may perform clipping operations (e.g., Z clipping operations) on certain-sized triangles (e.g., a small primitive/triangle that is below a size threshold). As indicated herein, clipping operations utilize a high amount of performance and power (e.g., performance and power at a GPU pipelines), which includes a high amount of serialized steps of calculations. As such, processing a high amount of these clipping workloads (e.g., Z clipping workloads) may slow down the performance (e.g., performance at a GPU). Based on the above, it may be beneficial to reduce the amount of clipping workloads (e.g., at a GPU). For instance, it may be beneficial to reduce the amount of Z clipping workloads (e.g., at a GPU). Also, it may be beneficial to increase the performance (e.g., performance at a GPU) due to clipping operations.

Aspects of the present disclosure may improve power and/or performance issues across a graphics pipeline (e.g., a graphics pipeline at a GPU). For instance, aspects presented herein may reduce an amount of clipping workloads (e.g., at a GPU). For example, aspects of the present disclosure may reduce an amount of Z clipping workloads (e.g., at a GPU). In order to do so, aspects of the present disclosure may selectively process clipping operations for certain-sized primitives/triangles. That is, aspects presented herein may calculate and determine a size of a primitive/triangle in order to perform a clipping operation. By doing so, aspects presented herein may increase performance (e.g., the performance at a GPU) due to clipping operations. For instance, aspects presented herein may increase the performance of the GPU by performing a clipping operation (e.g., Z-clipping operation) for certain-sized primitives/triangles (e.g., primitives/triangles that are greater a threshold size). For example, aspects presented herein may not perform primitive clipping when the primitive sizes are smaller than a threshold. This is because small primitives (e.g., primitives with a size below a threshold size) have a reduced amount of pixels, so pixel-level clipping (i.e., operating on each pixel) is faster than primitive-level clipping. Moreover, aspects presented herein may save the amount of processing power at a GPU by performing a clipping operation (e.g., Z-clipping operation) for certain-sized primitives/triangles (e.g., primitives/triangles that are greater a threshold size). By doing so, aspects presented herein may obtain a certain frame-level performance increase at the GPU (e.g., a 1%-10% frame-level performance increase).

In some instances, aspects of the present disclosure may determine whether the pixels in a primitive are within or outside of a certain range (e.g., a Z-value range). For instance, aspects presented herein may calculate a certain value for each pixel in the primitive (e.g., calculate a Z-value for each primitive including an area that is greater than an area threshold). If the pixels in the primitive are within a certain range (e.g., a Z-value range), they may be retained. Likewise, if the pixels in the primitive are outside of a certain range (e.g., a Z-value range), they may be discarded. In some aspects, if the printing level is disabled, the clipping operation may send the entire triangle down a GPU pipeline, and the pixel's value may be calculated. Also, if a Z-value is a larger than a certain value (e.g., a Z far value), then the pixel may be discarded. A "Z-value" may refer to a value for the Z direction. A "Z-value range" may refer to a range of Z-values. Accordingly, aspects presented herein may perform a clipping operation (e.g., a Z clipping operation) at a pixel level, rather than perform the clipping operation on the primitive/triangle level. For instance, aspects presented herein may adjust clipping at a primitive level (e.g., remove a portion of a primitive by a clipping operation) to clipping at a pixel level (e.g., calculate Z values, then remove the pixels whose Z values are out of range). By doing so, the amount performance utilized for clipping operations may be reduced. Also, aspects presented herein may perform clipping for certain-sized triangles (e.g., primitives/triangles that are greater a threshold size). As such, aspects presented herein may determine a size of a primitive/triangle, and then for certain-sized primitives/triangles (e.g., primitives/triangles that are below a threshold size), aspects presented herein may perform the pixel level clipping for the suitably sized primitives/triangles.

Additionally, in some instances, aspects presented herein relate to Z clipping for GPUs. As indicated above, clipping may be expensive in GPU pipelines, and it includes multiple serialized steps of calculations, so a heavy Z clipping workload may slow down the performance at a GPU. Aspects presented herein propose to replace primitive/triangle-level Z clipping with pixel/sample-level Z clipping for primitives/triangles below a certain size threshold (e.g., small triangles). Before performing the Z clipping on the primitives/triangles, aspects presented herein may calculate the determinant (area) of the triangles. If the primitives/triangles are below a certain size threshold (e.g., small primitives/triangles), aspects presented herein may not perform the Z clipping on these primitives/triangles. Likewise, if the primitives/triangles are above a certain size threshold (e.g., large primitives/triangles), aspects presented herein may perform the Z clipping on these primitives/triangles. After calculating the per-sample Z values for samples in these primitives/triangles, if the Z values are outside of a Z clipping range, then aspects presented herein may discard these samples. By doing so, aspects presented herein may obtain a certain frame-level performance increase at the GPU (e.g., a 1%-10% frame-level performance increase).

Also, for certain types of clipping operations (e.g., Z clipping operations), aspects presented herein may perform a viewport transform before the clipping operation. After this, aspects presented herein may calculate the area of the triangles in a screen space or viewing frustum. If the primitives/triangles are larger than a certain size threshold, aspects presented herein may perform the clipping operation (e.g., Z clipping operation). By doing so, aspects presented herein may reduce the rasterization workload and/or Z interpolation workload. If the primitives/triangles are less than a certain size threshold, aspects presented herein may disable clipping (e.g., Z clipping or Z clipping on primitives/triangles). Also, after rasterization and Z interpolation, if the samples' Z values are out of a certain range (e.g., a range of [0,1]), aspects presented herein may discard certain samples (e.g., Z clipping on samples).

Additionally, aspects presented herein may avoid clipping for every primitive/triangle, in order to save on processing power and reduce the total amount of clipping workloads. Aspects presented herein may determine whether a primitive/triangle is within a certain size threshold, and then perform a clipping operation on the pixel level for primitives/triangles. For example, aspects presented herein may determine whether a primitive/triangle is below a size threshold, and then perform a clipping operation on the pixel level (i.e., pixel-level clipping) for the primitives/triangles that are below the size threshold. In some instances, aspects presented herein may identify a subset of primitives in a set of primitives, where each of the subset of primitives include a primitive portion that is outside of a viewing frustum for the draw call operation, and where the primitive portion corresponds to less than all of each of the subset of primitives. A "draw call" or "draw call operation" may refer to a call to a graphics application program interface (API) to draw objects (e.g., draw a primitive/triangle). Then aspects presented herein may calculate an area of each of the subset of primitives including the primitive portion that is outside of the viewing frustum. Next, aspects presented herein may perform, or refrain from performing, a clipping operation for each of the subset of primitives based on the area of each of the subset of primitives being less than, equal to, or greater than an area threshold.

In some aspects, if the area of each of the subset of primitives is greater than the area threshold, aspects presented herein may perform the clipping operation for each of the subset of primitives. If the area of each of the subset of primitives is less than or equal to the area threshold, aspects presented herein may refrain from performing the clipping operation for each of the subset of primitives. Additionally, for each of the subset of primitives including the area of the primitive that is less than the area threshold, aspects presented herein may calculate a Z-value for each pixel in the primitive. The calculation of the Z-value may correspond to performing a Z-test for each pixel in the primitive. Based on the calculation of the Z-value, aspects presented herein may discard each pixel in the primitive including the Z-value that is outside of a Z-value range. Also, based on the calculation of the Z-value, aspects presented herein may perform a shading operation for each pixel in the primitive including the Z-value that is within a Z-value range. "Shading" or "shading operation" may refer to the process of altering a color of an object/surface/polygon in a graphics scene in order to create a photorealistic effect. In some aspects, shading may be performed during the rendering process by a program called a shader.

Further, in some instances, prior to identifying the subset of primitives, aspects presented herein may obtain an indication of a set of primitives for a draw call operation. That is, performing or refraining from performing the clipping operation may be done on a per-draw call basis. After obtaining the indication, aspects presented herein may perform at least one of a primitive assembly operation or a vertex transformation operation on the set of primitives for the draw call operation, where the identification of the subset of primitives is based on the performance of at least one of the primitive assembly operation or the vertex transformation operation. Moreover, after performing or refraining from performing the clipping operation, aspects presented herein may output an indication of the performance, or the refrainment from performance, of the clipping operation for each of the subset of primitives. Also, after outputting the indication and based on performing the clipping operation, aspects presented herein may perform, at least one of a viewport transform operation, a triangle setup operation, or a rasterization operation for each of the subset of primitives based on the area of each of the subset of primitives being greater than the area threshold.

Figure 7:
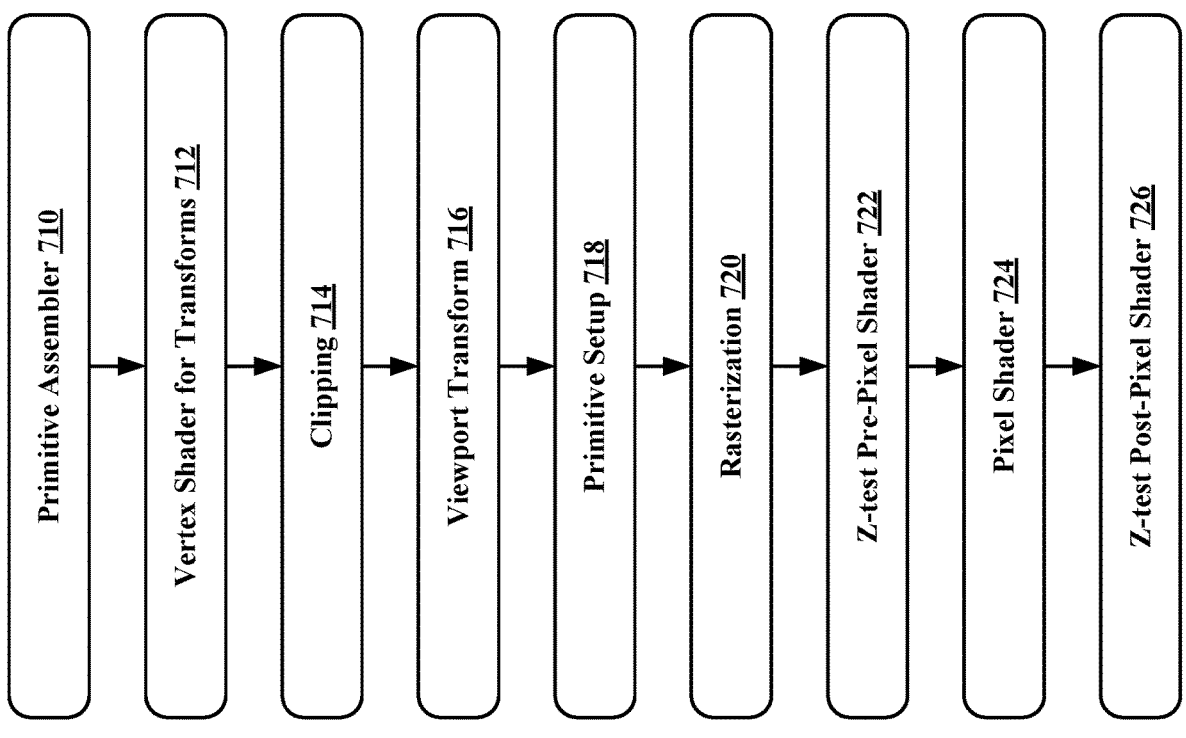
FIG. 7 is a diagram illustrating an example flowchart for a clipping operation.
Figure 7:

FIG. 7 is a diagram 700 illustrating an example flowchart for a clipping operation. More specifically, diagram 700 depicts an example flowchart for a Z clipping operation for primitives/triangles in a draw call operation. As shown in FIG. 7, diagram 700 includes a number of different steps (e.g., step 710, step 712, step 714, step 716, step 718, step 720, step 722, step 724, and step 726) in order to perform the Z clipping operation for primitives/triangles in the draw call operation. At step 710, aspects presented herein may perform a primitive assembler operation. For example, at step 710, the primitives and triangles may be assembled. At step 712, aspects presented herein may perform a vertex shader operation for transforms. For example, at step 712, the vertices may be shaded for transform operations. At step 714, aspects presented herein may perform a clipping operation (e.g., a Z clipping operation). For example, at step 714, the primitives/triangles may be clipped (e.g., via a Z clipping operation). At step 716, aspects presented herein may perform a viewport transform operation. For example, at step 716, a viewport transform may be performed on the clipped primitives/triangles.

Additionally, as depicted in FIG. 7, at step 718, aspects presented herein may perform a primitive setup. For example, at step 718, each of the primitives/triangles may be setup. At step 720, aspects presented herein may perform a rasterization process. For example, at step 720, each of the primitives/triangles may be rasterized. At step 722, aspects presented herein may perform a Z-test pre-pixel shader operation. For example, at step 722, a Z-test may be performed before a pixel shading. At step 724, aspects presented herein may perform a pixel shader operation. For example, at step 724, each of the pixels may be shaded. At step 726, aspects presented herein may perform a Z-test post-pixel shader operation. For example, at step 726, a Z-test may be performed after a pixel shading.

Figure 8:
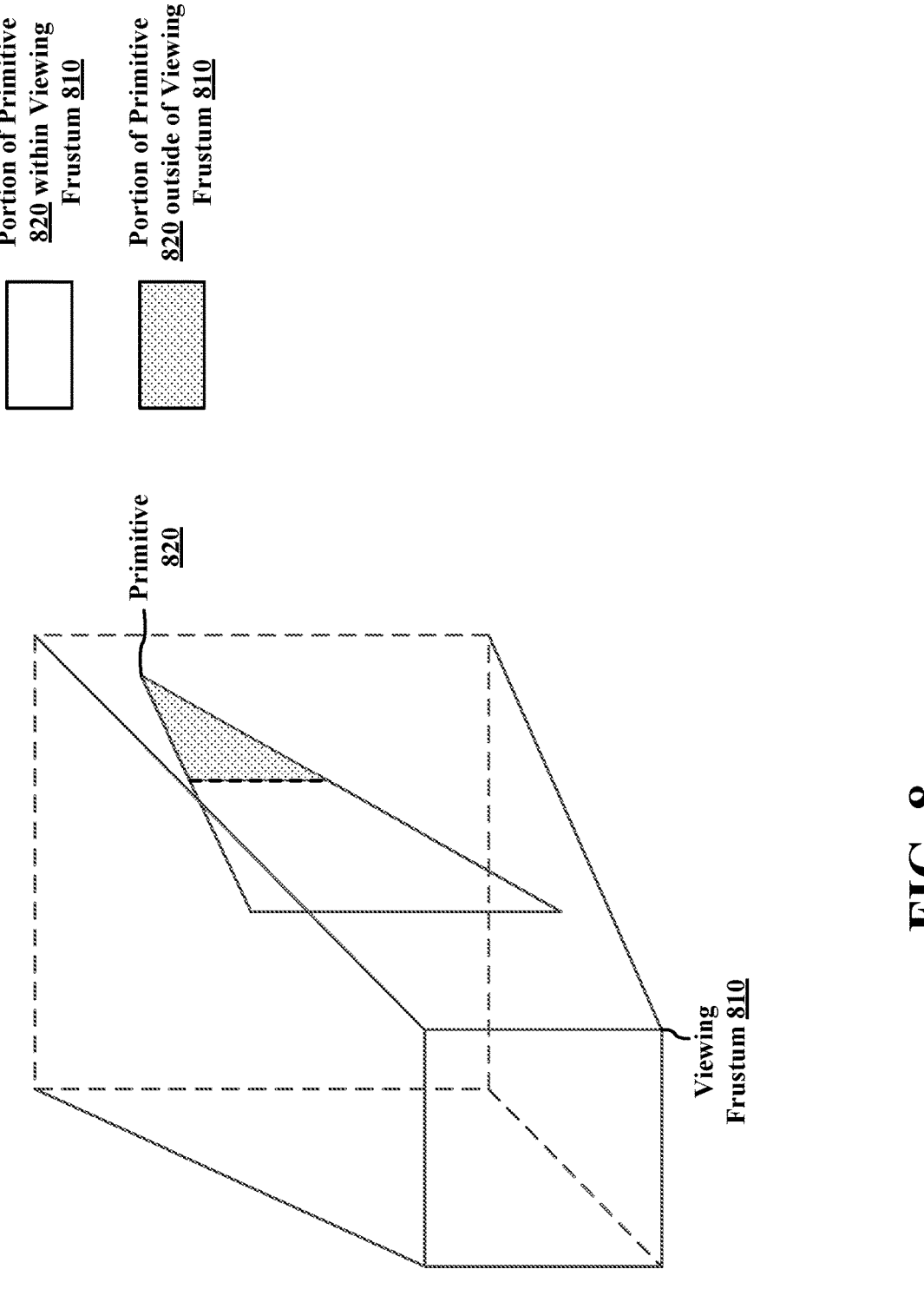
FIG. 8 is a diagram illustrating an example of a viewing frustum.

FIG. 8 is a diagram 800 illustrating an example of a viewing frustum. More specifically, diagram 800 depicts a viewing frustum that intersects a portion of a primitive. As shown in FIG. 8, diagram 800 includes viewing frustum 810 and primitive 820. FIG. 8 also depicts that viewing frustum 810 intersects a portion of primitive 820, such that a portion of primitive 820 is within viewing frustum 810 and a portion of primitive 820 is outside of viewing frustum 810. For example, the white portion of primitive 820 is within viewing frustum 810 and the dotted portion of primitive 820 is outside of viewing frustum 810.

As shown in FIG. 8, in reference to a clipping operation (e.g., step 714 in FIG. 7), aspects presented herein may check whether a certain primitive/triangle (e.g., primitive 820) is crossing the view frustum (e.g., viewing frustum 810) at a certain plane (e.g., a left plane, right plane, top plane, bottom plane, near plane, and/or far plane). If the primitive/triangle (e.g., primitive 820) is crossing one or more planes of the view frustum (e.g., viewing frustum 810), aspects presented herein may clip the triangle against the planes. Further, aspects presented herein may retain the portion of the primitive/triangle (e.g., primitive 820) that is inside a view frustum (e.g., viewing frustum 810). As clipping is a complex operation in a GPU, it may take multiple cycles to clip a primitive/triangle (e.g., primitive 820) against one plane in a view frustum (e.g., viewing frustum 810). Additionally, as a primitive/triangle (e.g., primitive 820) is crossing a far plane in a view frustum (e.g., viewing frustum 810), aspects presented herein may clip the primitive/triangle (e.g., primitive 820) and obtain the portion of the primitive/triangle that is inside the view frustum (e.g., viewing frustum 810). For example, the clipped primitive/ triangle may be transformed into a quadrilateral after clipping. Also, all pixels inside the quadrilateral (e.g., post-clipping the primitive/triangle) may have a Z value that is less than or equal to a Z far plane (e.g., Z far plane 610).

Figure 9:
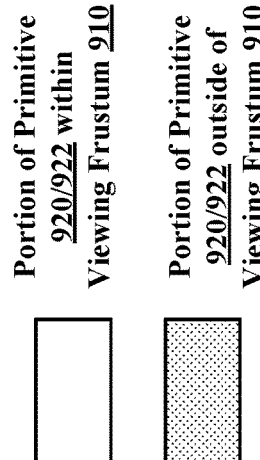
FIG. 9 is a diagram illustrating an example of a viewing frustum.
Figure 9:
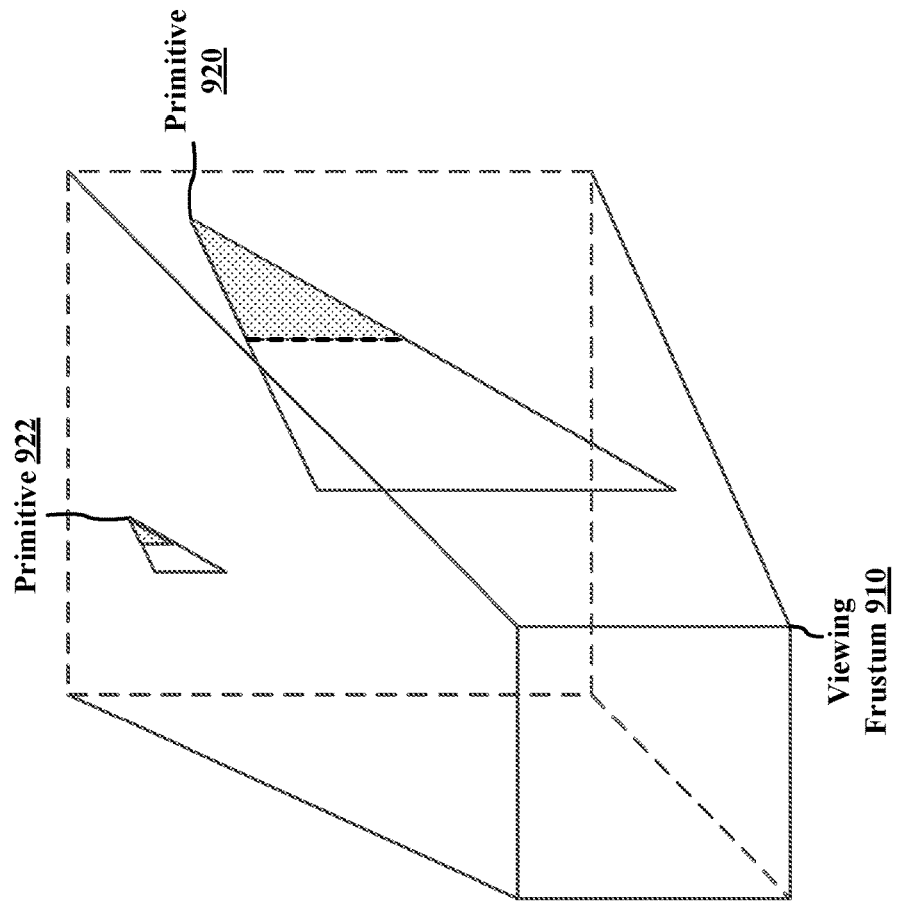

FIG. 9 is a diagram 900 illustrating an example of a viewing frustum. More specifically, diagram 900 depicts a viewing frustum that intersects a portion of a primitive. As shown in FIG. 9, diagram 900 includes viewing frustum 910, primitive 920, and primitive 922. FIG. 9 also depicts that viewing frustum 910 intersects a portion of primitive 920 and primitive 922, such that portions of primitive 920 and primitive 922 are within viewing frustum 910 and portion of primitive 920 and primitive 922 are outside of viewing frustum 910. For example, the white portions of primitive 920 and primitive 922 are within viewing frustum 910 and the dotted portions of primitive 920 and primitive 922 are outside of viewing frustum 910.

As shown in FIG. 9, in reference to a clipping operation (e.g., step 714 in FIG. 7), aspects presented herein may check whether a certain primitive/triangle (e.g., primitive 920 and/or primitive 922) is crossing the view frustum (e.g., viewing frustum 910) at a certain plane (e.g., a left plane, right plane, top plane, bottom plane, near plane, and/or far plane). If the primitive/triangle (e.g., primitive 920 and/or primitive 922) is crossing one or more planes (e.g., a near plane and/or a far plane) of the view frustum (e.g., viewing frustum 910), aspects presented herein may perform a view-port transform on the primitive/triangle (e.g., view frustum space to screen space). Further, aspects presented herein may calculate the area of the primitive/triangle (e.g., primitive 920 and/or primitive 922) on screen space. If the area of the primitive/triangle (e.g., primitive 920 and/or primitive 922) is less than a certain threshold, aspects of the present disclosure may refrain from clipping the primitive/triangle (e.g., refrain from clipping the primitive/triangle against the near plane and/or far plane of the view frustum).

Additionally, as a primitive/triangle (e.g., primitive 922) is crossing a far plane in a view frustum (e.g., viewing frustum 910), and it has a small screen area, aspects presented herein may refrain from clipping the primitive/ triangle (e.g., primitive 922). For instance, at a Z-test stage before a pixel shader (e.g., step 722 in FIG. 7), aspects presented herein may calculate a per-pixel Z value for all pixels of the primitive/triangle (e.g., primitive 922). If the pixel Z value is greater than a far plane, aspects presented herein may discard the pixel. After this, the pixels with a Z value that is less than or equal to the far plane may go to the Z-test. Also, as small primitives/triangles (e.g., primitive 922) may not have many pixels after rasterization (e.g., step 720 in FIG. 7), a GPU may be able to process these pixels quickly. As such, this may be faster than clipping the primitive/triangle (e.g., primitive 922) in the clipping stage (e.g., step 714 in FIG. 7).

Further, as a primitive/triangle (e.g., primitive 920) is crossing a far plane in a view frustum (e.g., viewing frustum 910), and it has large screen area, aspects presented herein may clip the primitive/triangle (e.g., primitive 920). After the clipping operation, aspects presented herein may retain the portion of primitive/triangle (e.g., primitive 920) that is inside view frustum (e.g., the white portion of primitive 920). For example, the clipped primitive/triangle may be transformed into a quadrilateral after clipping. Also, all pixels inside the quadrilateral (e.g., post-clipping the primitive/triangle) may have a Z value that is less than or equal to a Z far plane (e.g., Z far plane 610) value. Moreover, clipping the large primitives/triangles (e.g., primitive 920) may be performed because they can generate multiple pixels at rasterization (e.g., step 720 in FIG. 7). A GPU may also need to spend multiple cycles to check that these pixels' Z values is less than or equal to a Z far plane (e.g., Z far plane 610) value on a one-by-one basis, which may slow down the operation of the GPU.

Aspects of the present disclosure may include a number of benefits or advantages. For instance, aspects of the present disclosure may improve power and/or performance issues across a graphics pipeline (e.g., a graphics pipeline at a GPU). Aspects presented herein may also reduce an amount of clipping workloads (e.g., at a GPU). That is, aspects of the present disclosure may reduce an amount of Z clipping workloads (e.g., at a GPU). Also, aspects of the present disclosure may selectively process clipping operations for certain-sized primitives/triangles. For example, aspects presented herein may calculate and determine a size of a primitive/triangle in order to perform a clipping operation. Aspects presented herein may also increase performance (e.g., the performance at a GPU) due to clipping operations. Indeed, aspects presented herein may increase the performance of the GPU by performing a clipping operation (e.g., Z-clipping operation) for certain-sized primitives/triangles (e.g., primitives/triangles that are below a threshold size). Further, aspects presented herein may save the amount of processing power at a GPU by performing a clipping operation (e.g., Z-clipping operation) for certain-sized primitives/ triangles (e.g., primitives/triangles that are below a threshold size). Aspects presented herein may also obtain a certain frame-level performance increase at the GPU (e.g., a 1%-10% frame-level performance increase).

Figure 10:
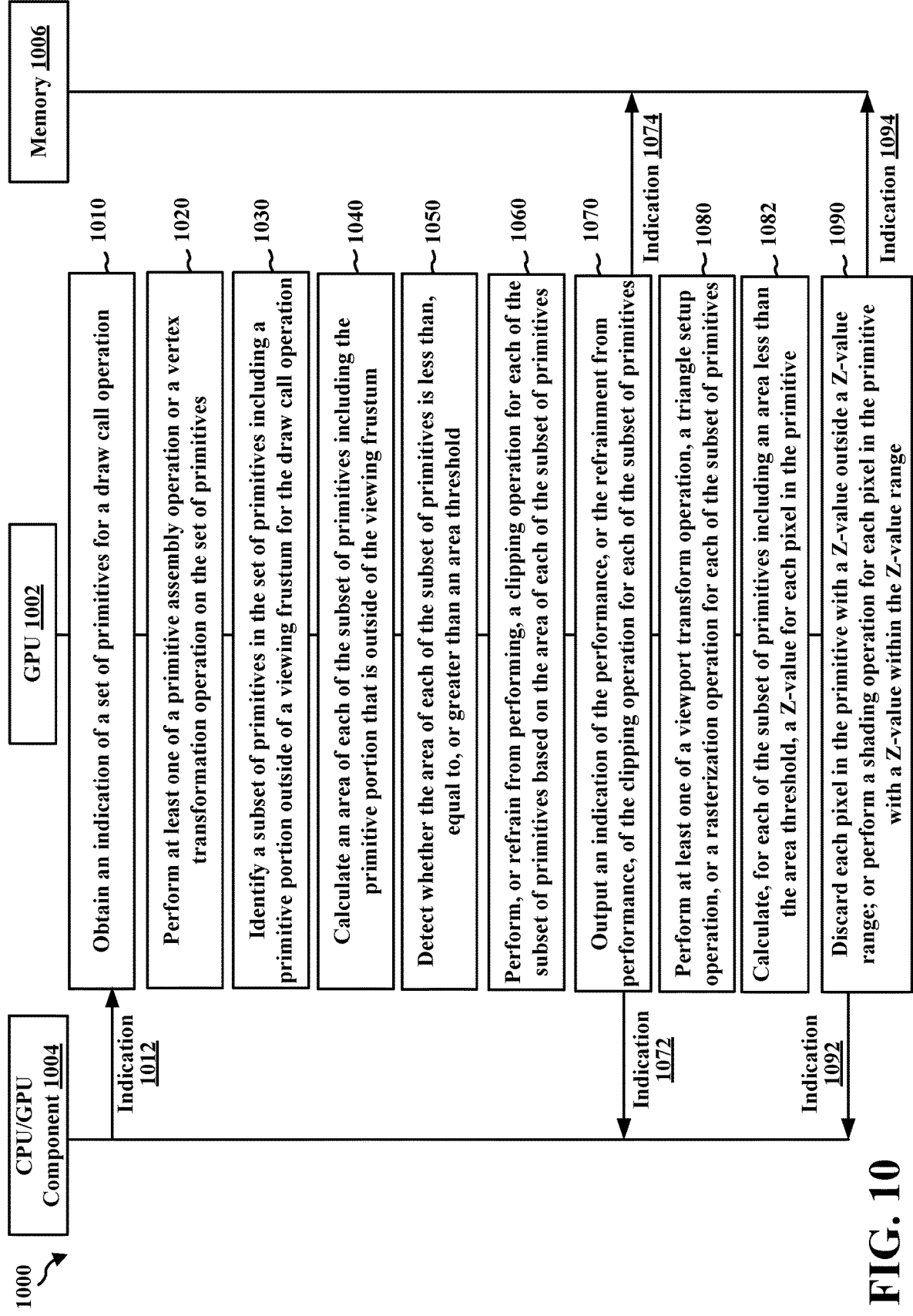
FIG. 10 is a communication flow diagram illustrating example communications between a GPU, a CPU or GPU component, and a memory.

FIG. 10 is a communication flow diagram 1000 of frame processing in accordance with one or more techniques of this disclosure. As shown in FIG. 10, diagram 1000 includes example communications between GPU 1002 (e.g., a GPU, a graphics processor, a CPU, a central processor, or any apparatus that may perform graphics processing), CPU/GPU component 1004 (e.g., a GPU, a graphics processor, a CPU, a central processor, or any apparatus that may perform graphics processing), and memory 1006 (e.g., a memory or a cache in a GPU or CPU), in accordance with one or more techniques of this disclosure.

At 1010, GPU 1002 may obtain an indication of a set of primitives for a draw call operation. For example, GPU 1002 may obtain indication 1012 from CPU/GPU component 1004.

At 1020, GPU 1002 may perform at least one of a primitive assembly operation or a vertex transformation operation on the set of primitives for the draw call operation, where an identification of a subset of primitives is based on the performance of at least one of the primitive assembly operation or the vertex transformation operation.

At 1030, GPU 1002 may identify a subset of primitives in the set of primitives, where each of the subset of primitives include a primitive portion that is outside of a viewing frustum for the draw call operation, and where the primitive portion corresponds to less than all of each of the subset of primitives. In some aspects, each of the subset of primitives may include the primitive portion that is outside of the viewing frustum in a Z-direction (e.g., a depth direction). Also, the viewing frustum may intersect each of the subset of primitives. Further, a portion of each of the subset of primitives may be within the viewing frustum.

At 1040, GPU 1002 may calculate an area of each of the subset of primitives including the primitive portion that is outside of the viewing frustum.

At 1050, GPU 1002 may detect whether the area of each of the subset of primitives is less than, equal to, or greater than the area threshold, where a performance, or a refrainment from performance, of a clipping operation for each of the subset of primitives is based on the detection.

At 1060, GPU 1002 may perform, or refrain from performing, a clipping operation for each of the subset of primitives based on the area of each of the subset of primitives being less than, equal to, or greater than an area threshold. In some aspects, performing the clipping operation for each of the subset of primitives may comprise: performing the clipping operation for each of the subset of primitives based on the area of each of the subset of primitives being greater than the area threshold. Also, performing the clipping operation for each of the subset of primitives may comprise: performing the clipping operation for each of the subset of primitives based on the area of each of the subset of primitives being greater than the area threshold on a per-draw call basis. Further, refraining from performing the clipping operation for each of the subset of primitives may comprise: refraining from performing the clipping operation for each of the subset of primitives based on the area of each of the subset of primitives being less than or equal to the area threshold.

At 1070, GPU 1002 may output an indication of the performance, or the refrainment from performance, of the clipping operation for each of the subset of primitives. In some aspects, outputting the indication of the performance, or the refrainment from performance, of the clipping operation for each of the subset of primitives may comprise: transmitting the indication of the performance, or the refrainment from performance, of the clipping operation for each of the subset of primitives (e.g., GPU 1002 may transmit indication 1072 to CPU/GPU component 1004). Also, outputting the indication of the performance, or the refrainment from performance, of the clipping operation for each of the subset of primitives may comprise: storing the indication of the performance, or the refrainment from performance, of the clipping operation for each of the subset of primitives (e.g., GPU 1002 may store indication 1074 in memory 1006).

At 1080, GPU 1002 may perform, based on the performance of the clipping operation, at least one of a viewport transform operation, a triangle setup operation, or a rasterization operation for each of the subset of primitives based on the area of each of the subset of primitives being greater than the area threshold.

At 1082, GPU 1002 may calculate, for each of the subset of primitives including the area of the primitive that is less than the area threshold, a Z-value for each pixel in the primitive. In some aspects, calculating the Z-value for each pixel in the primitive may comprise: performing a Z-test for each pixel in the primitive.

At 1090, GPU 1002 may discard, based on the calculation of the Z-value, each pixel in the primitive including the Z-value that is outside of a Z-value range.

Also, at 1090, GPU 1002 may perform, based on the calculation of the Z-value, a shading operation for each pixel in the primitive including the Z-value that is within a Z-value range.

As shown at 1090, GPU 1002 may output an indication of the performance of the shading operation for each pixel in the primitive including the Z-value that is within the Z-value range. In some aspects, outputting the indication of the performance of the shading operation for each pixel in the primitive including the Z-value that is within the Z-value range may comprise: transmitting the indication of the performance of the shading operation for each pixel in the primitive including the Z-value that is within the Z-value range (e.g., GPU 1002 may transmit indication 1092 to CPU/GPU component 1004). Also, outputting the indication of the performance of the shading operation for each pixel in the primitive including the Z-value that is within the Z-value range may comprise: storing the indication of the performance of the shading operation for each pixel in the primitive including the Z-value that is within the Z-value range (e.g., GPU 1002 may store indication 1094 in memory 1006).

FIG. 11 is a flowchart 1100 of an example method of graphics processing in accordance with one or more techniques of this disclosure. The method may be performed by a GPU (or other graphics processor), a CPU (or other central processor), a GPU driver, a DDIC, an apparatus for graphics processing, a wireless communication device, and/or any apparatus that may perform graphics processing as used in connection with the examples of FIGS. 1-10.

At 1102, the GPU may obtain an indication of a set of primitives for a draw call operation, as described in connection with the examples in FIGS. 1-10. For example, as described in 1010 of FIG. 10, GPU 1002 may obtain an indication of a set of primitives for a draw call operation. Further, step 1102 may be performed by processing unit 120 in FIG. 1.

At 1106, the GPU may identify a subset of primitives in the set of primitives, where each of the subset of primitives include a primitive portion that is outside of a viewing frustum for the draw call operation, and where the primitive portion corresponds to less than all of each of the subset of primitives, as described in connection with the examples in FIGS. 1-10. For example, as described in 1030 of FIG. 10, GPU 1002 may identify a subset of primitives in the set of primitives, where each of the subset of primitives include a primitive portion that is outside of a viewing frustum for the draw call operation, and where the primitive portion corresponds to less than all of each of the subset of primitives. Further, step 1106 may be performed by processing unit 120 in FIG. 1. In some aspects, each of the subset of primitives may include the primitive portion that is outside of the viewing frustum in a Z-direction (e.g., a depth direction). Also, the viewing frustum may intersect each of the subset of primitives. Further, a portion of each of the subset of primitives may be within the viewing frustum.

At 1108, the GPU may calculate an area of each of the subset of primitives including the primitive portion that is outside of the viewing frustum, as described in connection with the examples in FIGS. 1-10. For example, as described in 1040 of FIG. 10, GPU 1002 may calculate an area of each of the subset of primitives including the primitive portion that is outside of the viewing frustum. Further, step 1108 may be performed by processing unit 120 in FIG. 1.

At 1112, the GPU may perform, or refrain from performing, a clipping operation for each of the subset of primitives based on the area of each of the subset of primitives being less than, equal to, or greater than an area threshold, as described in connection with the examples in FIGS. 1-10. For example, as described in 1060 of FIG. 10, GPU 1002 may perform, or refrain from performing, a clipping operation for each of the subset of primitives based on the area of each of the subset of primitives being less than, equal to, or greater than an area threshold. Further, step 1112 may be performed by processing unit 120 in FIG. 1. In some aspects, performing the clipping operation for each of the subset of primitives may comprise: performing the clipping operation for each of the subset of primitives based on the area of each of the subset of primitives being greater than the area threshold. Also, performing the clipping operation for each of the subset of primitives may comprise: performing the clipping operation for each of the subset of primitives based on the area of each of the subset of primitives being greater than the area threshold on a per-draw call basis. Further, refraining from performing the clipping operation for each of the subset of primitives may comprise: refraining from performing the clipping operation for each of the subset of primitives based on the area of each of the subset of primitives being less than or equal to the area threshold.

FIG. 12 is a flowchart 1200 of an example method of graphics processing in accordance with one or more techniques of this disclosure. The method may be performed by a GPU (or other graphics processor), a CPU (or other central processor), a GPU driver, a DDIC, an apparatus for graphics processing, a wireless communication device, and/or any apparatus that may perform graphics processing as used in connection with the examples of FIGS. 1-10.

At 1202, the GPU may obtain an indication of a set of primitives for a draw call operation, as described in connection with the examples in FIGS. 1-10. For example, as described in 1010 of FIG. 10, GPU 1002 may obtain an indication of a set of primitives for a draw call operation. Further, step 1202 may be performed by processing unit 120 in FIG. 1.

At 1204, the GPU may perform at least one of a primitive assembly operation or a vertex transformation operation on the set of primitives for the draw call operation, where an identification of a subset of primitives is based on the performance of at least one of the primitive assembly operation or the vertex transformation operation, as described in connection with the examples in FIGS. 1-10. For example, as described in 1020 of FIG. 10, GPU 1002 may perform at least one of a primitive assembly operation or a vertex transformation operation on the set of primitives for the draw call operation, where an identification of a subset of primitives is based on the performance of at least one of the primitive assembly operation or the vertex transformation operation. Further, step 1204 may be performed by processing unit 120 in FIG. 1.

At 1206, the GPU may identify a subset of primitives in the set of primitives, where each of the subset of primitives include a primitive portion that is outside of a viewing frustum for the draw call operation, and where the primitive portion corresponds to less than all of each of the subset of primitives, as described in connection with the examples in FIGS. 1-10. For example, as described in 1030 of FIG. 10, GPU 1002 may identify a subset of primitives in the set of primitives, where each of the subset of primitives include a primitive portion that is outside of a viewing frustum for the draw call operation, and where the primitive portion corresponds to less than all of each of the subset of primitives. Further, step 1206 may be performed by processing unit 120 in FIG. 1. In some aspects, each of the subset of primitives may include the primitive portion that is outside of the viewing frustum in a Z-direction (e.g., a depth direction). Also, the viewing frustum may intersect each of the subset of primitives. Further, a portion of each of the subset of primitives may be within the viewing frustum.

At 1208, the GPU may calculate an area of each of the subset of primitives including the primitive portion that is outside of the viewing frustum, as described in connection with the examples in FIGS. 1-10. For example, as described in 1040 of FIG. 10, GPU 1002 may calculate an area of each of the subset of primitives including the primitive portion that is outside of the viewing frustum. Further, step 1208 may be performed by processing unit 120 in FIG. 1.

At 1210, the GPU may detect whether the area of each of the subset of primitives is less than, equal to, or greater than the area threshold, where a performance, or a refrainment from performance, of a clipping operation for each of the subset of primitives is based on the detection, as described in connection with the examples in FIGS. 1-10. For example, as described in 1050 of FIG. 10, GPU 1002 may detect whether the area of each of the subset of primitives is less than, equal to, or greater than the area threshold, where a performance, or a refrainment from performance, of a clipping operation for each of the subset of primitives is based on the detection. Further, step 1210 may be performed by processing unit 120 in FIG. 1.

At 1212, the GPU may perform, or refrain from performing, a clipping operation for each of the subset of primitives based on the area of each of the subset of primitives being less than, equal to, or greater than an area threshold, as described in connection with the examples in FIGS. 1-10. For example, as described in 1060 of FIG. 10, GPU 1002 may perform, or refrain from performing, a clipping operation for each of the subset of primitives based on the area of each of the subset of primitives being less than, equal to, or greater than an area threshold. Further, step 1212 may be performed by processing unit 120 in FIG. 1. In some aspects, performing the clipping operation for each of the subset of primitives may comprise: performing the clipping operation for each of the subset of primitives based on the area of each of the subset of primitives being greater than the area threshold. Also, performing the clipping operation for each of the subset of primitives may comprise: performing the clipping operation for each of the subset of primitives based on the area of each of the subset of primitives being greater than the area threshold on a per-draw call basis. Further, refraining from performing the clipping operation for each of the subset of primitives may comprise: refraining from performing the clipping operation for each of the subset of primitives based on the area of each of the subset of primitives being less than or equal to the area threshold.

At 1214, the GPU may output an indication of the performance, or the refrainment from performance, of the clipping operation for each of the subset of primitives, as described in connection with the examples in FIGS. 1-10.

For example, as described in 1070 of FIG. 10, GPU 1002 may output an indication of the performance, or the refrainment from performance, of the clipping operation for each of the subset of primitives. Further, step 1214 may be performed by processing unit 120 in FIG. 1. In some aspects, outputting the indication of the performance, or the refrainment from performance, of the clipping operation for each of the subset of primitives may comprise: transmitting the indication of the performance, or the refrainment from performance, of the clipping operation for each of the subset of primitives (e.g., GPU 1002 may transmit indication 1072 to CPU/GPU component 1004). Also, outputting the indication of the performance, or the refrainment from performance, of the clipping operation for each of the subset of primitives may comprise: storing the indication of the performance, or the refrainment from performance, of the clipping operation for each of the subset of primitives (e.g., GPU 1002 may store indication 1074 in memory 1006).

At 1216, the GPU may perform, based on the performance of the clipping operation, at least one of a viewport transform operation, a triangle setup operation, or a rasterization operation for each of the subset of primitives based on the area of each of the subset of primitives being greater than the area threshold, as described in connection with the examples in FIGS. 1-10. For example, as described in 1080 of FIG. 10, GPU 1002 may perform, based on the performance of the clipping operation, at least one of a viewport transform operation, a triangle setup operation, or a rasterization operation for each of the subset of primitives based on the area of each of the subset of primitives being greater than the area threshold. Further, step 1216 may be performed by processing unit 120 in FIG. 1.

At 1218, the GPU may calculate, for each of the subset of primitives including the area of the primitive that is less than the area threshold, a Z-value for each pixel in the primitive, as described in connection with the examples in FIGS. 1-10. For example, as described in 1082 of FIG. 10, GPU 1002 may calculate, for each of the subset of primitives including the area of the primitive that is less than the area threshold, a Z-value for each pixel in the primitive. Further, step 1218 may be performed by processing unit 120 in FIG. 1. In some aspects, calculating the Z-value for each pixel in the primitive may comprise: performing a Z-test for each pixel in the primitive.

At 1220, the GPU may discard, based on the calculation of the Z-value, each pixel in the primitive including the Z-value that is outside of a Z-value range, as described in connection with the examples in FIGS. 1-10. For example, as described in 1090 of FIG. 10, GPU 1002 may discard, based on the calculation of the Z-value, each pixel in the primitive including the Z-value that is outside of a Z-value range. Further, step 1220 may be performed by processing unit 120 in FIG. 1.

Also, at 1220, GPU may perform, based on the calculation of the Z-value, a shading operation for each pixel in the primitive including the Z-value that is within a Z-value range, as described in connection with the examples in FIGS. 1-10. For example, as described in 1090 of FIG. 10, GPU 1002 may perform, based on the calculation of the Z-value, a shading operation for each pixel in the primitive including the Z-value that is within a Z-value range. Further, step 1220 may be performed by processing unit 120 in FIG. 1.

Also, GPU may output an indication of the performance of the shading operation for each pixel in the primitive including the Z-value that is within the Z-value range. In some aspects, outputting the indication of the performance of the shading operation for each pixel in the primitive including the Z-value that is within the Z-value range may comprise: transmitting the indication of the performance of the shading operation for each pixel in the primitive including the Z-value that is within the Z-value range (e.g., GPU 1002 may transmit indication 1092 to CPU/GPU component 1004). Also, outputting the indication of the performance of the shading operation for each pixel in the primitive including the Z-value that is within the Z-value range may comprise: storing the indication of the performance of the shading operation for each pixel in the primitive including the Z-value that is within the Z-value range (e.g., GPU 1002 may store indication 1094 in memory 1006).

In configurations, a method or an apparatus for display processing is provided. The apparatus may be a GPU (or other graphics processor), a CPU (or other central processor), a GPU driver, a DDIC, an apparatus for graphics processing, a wireless communication device, and/or some other processor that may perform display processing. In aspects, the apparatus may be the processing unit 120 within the device 104, or may be some other hardware within the device 104 or another device. The apparatus, e.g., processing unit 120, may include means for obtaining an indication of a set of primitives for a draw call operation. The apparatus, e.g., processing unit 120, may also include means for identifying a subset of primitives in the set of primitives, where each of the subset of primitives include a primitive portion that is outside of a viewing frustum for the draw call operation, and where the primitive portion corresponds to less than all of each of the subset of primitives. The apparatus, e.g., processing unit 120, may also include means for calculating an area of each of the subset of primitives including the primitive portion that is outside of the viewing frustum. The apparatus, e.g., processing unit 120, may also include means for performing, or refraining from performing, a clipping operation for each of the subset of primitives based on the area of each of the subset of primitives being less than, equal to, or greater than an area threshold. The apparatus, e.g., processing unit 120, may also include means for outputting an indication of the performance, or the refrainment from performance, of the clipping operation for each of the subset of primitives. The apparatus, e.g., processing unit 120, may also include means for detecting whether the area of each of the subset of primitives is less than, equal to, or greater than the area threshold, where the performance, or the refrainment from performance, of the clipping operation for each of the subset of primitives is based on the detection. The apparatus, e.g., processing unit 120, may also include means for calculating, for each of the subset of primitives including the area of the primitive that is less than the area threshold, a Z-value for each pixel in the primitive. The apparatus, e.g., processing unit 120, may also include means for discarding, based on the calculation of the Z-value, each pixel in the primitive including the Z-value that is outside of a Z-value range. The apparatus, e.g., processing unit 120, may also include means for performing, based on the calculation of the Z-value, a shading operation for each pixel in the primitive including the Z-value that is within a Z-value range. The apparatus, e.g., processing unit 120, may also include means for outputting an indication of the performance of the shading operation for each pixel in the primitive including the Z-value that is within the Z-value range. The apparatus, e.g., processing unit 120, may also include means for performing at least one of a primitive assembly operation or a vertex transformation operation on the set of primitives for the draw call operation, where the identification of the subset of primitives is based on the performance of at least one of the primitive assembly operation or the vertex transformation operation. The apparatus, e.g., processing unit 120, may also include means for performing, based on the performance of the clipping operation, at least one of a viewport transform operation, a triangle setup operation, or a rasterization operation for each of the subset of primitives based on the area of each of the subset of primitives being greater than the area threshold.

The subject matter described herein may be implemented to realize one or more benefits or advantages. For instance, the described display processing techniques may be used by a GPU (or other graphics processor), a CPU (or other central processor), a GPU driver, a DDIC, an apparatus for graphics processing, a wireless communication device, or some other processor that may perform display processing to implement the primitive clipping techniques described herein. This may also be accomplished at a low cost compared to other display processing techniques. Moreover, the graphics processing techniques herein may improve or speed up data processing or execution. Further, the graphics processing techniques herein may improve resource or data utilization and/or resource efficiency. Additionally, aspects of the present disclosure may utilize primitive clipping techniques in order to improve memory bandwidth efficiency and/or increase processing speed at a GPU and/or a CPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs. e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing, including at least one memory; and at least one processor coupled to the at least one memory and, based at least in part on information stored in the at least one memory, the at least one processor, individually or in any combination, is configured to: obtain an indication of a set of primitives for a draw call operation; identify a subset of primitives in the set of primitives, wherein each of the subset of primitives include a primitive portion that is outside of a viewing frustum for the draw call operation, and wherein the primitive portion corresponds to less than all of each of the subset of primitives; calculate an area of each of the subset of primitives including the primitive portion that is outside of the viewing frustum; and perform, or refrain from performing, a clipping operation for each of the subset of primitives based on the area of each of the subset of primitives being less than, equal to, or greater than an area threshold.

Aspect 2 is the apparatus of aspect 1, wherein the at least one processor, individually or in any combination, is further configured to: output an indication of the performance, or the refrainment from performance, of the clipping operation for each of the subset of primitives.

Aspect 3 is the apparatus of aspect 2, wherein to output the indication of the performance, or the refrainment from performance, of the clipping operation for each of the subset of primitives, the at least one processor, individually or in any combination, is configured to: transmit the indication of the performance, or the refrainment from performance, of the clipping operation for each of the subset of primitives; or store the indication of the performance, or the refrainment from performance, of the clipping operation for each of the subset of primitives.

Aspect 4 is the apparatus of any of aspects 1 to 3, wherein to perform the clipping operation for each of the subset of primitives, the at least one processor, individually or in any combination, is configured to: perform the clipping operation for each of the subset of primitives based on the area of each of the subset of primitives being greater than the area threshold.

Aspect 5 is the apparatus of aspect 4, wherein to perform the clipping operation for each of the subset of primitives, the at least one processor, individually or in any combination, is configured to: perform the clipping operation for each of the subset of primitives based on the area of each of the subset of primitives being greater than the area threshold on a per-draw call basis.

Aspect 6 is the apparatus of any of aspects 1 to 5, wherein to refrain from performing the clipping operation for each of the subset of primitives, the at least one processor, individually or in any combination, is configured to: refrain from performing the clipping operation for each of the subset of primitives based on the area of each of the subset of primitives being less than or equal to the area threshold.

Aspect 7 is the apparatus of any of aspects 1 to 6, wherein the at least one processor, individually or in any combination, is further configured to: detect whether the area of each of the subset of primitives is less than, equal to, or greater than the area threshold, wherein the performance, or the refrainment from performance, of the clipping operation for each of the subset of primitives is based on the detection.

Aspect 8 is the apparatus of any of aspects 1 to 7, wherein the at least one processor, individually or in any combination, is further configured to: calculate, for each of the subset of primitives including the area of the primitive that is less than the area threshold, a Z-value for each pixel in the primitive.

Aspect 9 is the apparatus of aspect 8, wherein the at least one processor, individually or in any combination, is further configured to: discard, based on the calculation of the Z-value, each pixel in the primitive including the Z-value that is outside of a Z-value range.

Aspect 10 is the apparatus of aspect 8, wherein the at least one processor, individually or in any combination, is further configured to: perform, based on the calculation of the Z-value, a shading operation for each pixel in the primitive including the Z-value that is within a Z-value range.

Aspect 11 is the apparatus of aspect 10, wherein the at least one processor, individually or in any combination, is further configured to: output an indication of the performance of the shading operation for each pixel in the primitive including the Z-value that is within the Z-value range.

Aspect 12 is the apparatus of aspect 11, wherein to output the indication of the performance of the shading operation for each pixel in the primitive including the Z-value that is within the Z-value range, the at least one processor, individually or in any combination, is configured to: transmit the indication of the performance of the shading operation for each pixel in the primitive including the Z-value that is within the Z-value range; or store the indication of the performance of the shading operation for each pixel in the primitive including the Z-value that is within the Z-value range.

Aspect 13 is the apparatus of any of aspects 8 to 12, wherein to calculate the Z-value for each pixel in the primitive, the at least one processor, individually or in any combination, is configured to: perform a Z-test for each pixel in the primitive.

Aspect 14 is the apparatus of any of aspects 1 to 13, wherein the at least one processor, individually or in any combination, is further configured to: perform at least one of a primitive assembly operation or a vertex transformation operation on the set of primitives for the draw call operation, wherein the identification of the subset of primitives is based on the performance of at least one of the primitive assembly operation or the vertex transformation operation.

Aspect 15 is the apparatus of any of aspects 1 to 14, wherein the at least one processor, individually or in any combination, is further configured to: perform, based on the performance of the clipping operation, at least one of a viewport transform operation, a triangle setup operation, or a rasterization operation for each of the subset of primitives based on the area of each of the subset of primitives being greater than the area threshold.

Aspect 16 is the apparatus of any of aspects 1 to 15, wherein each of the subset of primitives includes the primitive portion that is outside of the viewing frustum in a Z-direction.

Aspect 17 is the apparatus of any of aspects 1 to 16, wherein the viewing frustum intersects each of the subset of primitives, and wherein a portion of each of the subset of primitives is within the viewing frustum.

Aspect 18 is the apparatus of any of aspects 1 to 17, further comprising at least one of an antenna or a transceiver coupled to the at least one processor, wherein to obtain the indication of the set of primitives for the draw call operation, the at least one processor, individually or in any combination, is configured to: obtain, via at least one of the antenna or the transceiver, the indication of the set of primitives for the draw call operation.

Aspect 19 is a method of graphics processing for implementing any of aspects 1 to 18.

Aspect 20 is an apparatus for graphics processing including means for implementing any of aspects 1 to 18.

Aspect 21 is a computer-readable medium (e.g., a non-transitory computer-readable medium) storing computer executable code, the code when executed by at least one processor causes the at least one processor to implement any of aspects 1 to 18.

What is claimed is:

1. An apparatus for graphics processing, comprising:
at least one memory; and
at least one processor coupled to the at least one memory and, based at least in part on information stored in the at least one memory, the at least one processor is configured to:
    obtain an indication of a set of primitives for a draw call operation;
    identify a subset of primitives in the set of primitives, wherein each of the subset of primitives include a primitive portion that is outside of a viewing frustum for the draw call operation, and wherein the primitive portion corresponds to less than all of each of the subset of primitives;
    calculate an area of each of the subset of primitives including the primitive portion that is outside of the viewing frustum; and
    perform, or refrain from performing, a clipping operation for each of the subset of primitives based on the area of each of the subset of primitives being less than, equal to, or greater than an area threshold, wherein performance or refrainment from performance of the clipping operation is based on a per-draw call basis, and wherein the performance of the clipping operation for each of the subset of primitives is based on the area of each of the subset of primitives being greater than the area threshold on the per-draw call basis.

2. The apparatus of claim 1, wherein the at least one processor is further configured to:
    output an indication of the performance, or the refrainment from performance, of the clipping operation for each of the subset of primitives.

3. The apparatus of claim 2, wherein to output the indication of the performance, or the refrainment from performance, of the clipping operation for each of the subset of primitives, the at least one processor is configured to:

transmit the indication of the performance, or the refrainment from performance, of the clipping operation for each of the subset of primitives; or
    store the indication of the performance, or the refrainment from performance, of the clipping operation for each of the subset of primitives.

4. The apparatus of claim 1, wherein to perform the clipping operation for each of the subset of primitives, the at least one processor is configured to: perform the clipping operation for each of the subset of primitives based on the area of each of the subset of primitives being greater than the area threshold.

5. The apparatus of claim 1, wherein to refrain from performing the clipping operation for each of the subset of primitives, the at least one processor is configured to: refrain from performing the clipping operation for each of the subset of primitives based on the area of each of the subset of primitives being less than or equal to the area threshold.

6. The apparatus of claim 1, wherein the at least one processor is further configured to:
    detect whether the area of each of the subset of primitives is less than, equal to, or greater than the area threshold, wherein the performance, or the refrainment from performance, of the clipping operation for each of the subset of primitives is based on the detection.

7. The apparatus of claim 1, wherein the at least one processor is further configured to:
    calculate, for each of the subset of primitives including the area of the primitive that is less than the area threshold, a Z-value for each pixel in the primitive.

8. The apparatus of claim 7, wherein the at least one processor is further configured to:
    discard, based on the calculation of the Z-value, each pixel in the primitive including the Z-value that is outside of a Z-value range.

9. The apparatus of claim 7, wherein the at least one processor is further configured to:
    perform, based on the calculation of the Z-value, a shading operation for each pixel in the primitive including the Z-value that is within a Z-value range.

10. The apparatus of claim 9, wherein the at least one processor is further configured to:
    output an indication of the performance of the shading operation for each pixel in the primitive including the Z-value that is within the Z-value range.

11. The apparatus of claim 10, wherein to output the indication of the performance of the shading operation for each pixel in the primitive including the Z-value that is within the Z-value range, the at least one processor is configured to:
    transmit the indication of the performance of the shading operation for each pixel in the primitive including the Z-value that is within the Z-value range; or
    store the indication of the performance of the shading operation for each pixel in the primitive including the Z-value that is within the Z-value range.

12. The apparatus of claim 7, wherein to calculate the Z-value for each pixel in the primitive, the at least one processor is configured to: perform a Z-test for each pixel in the primitive.

13. The apparatus of claim 1, wherein the at least one processor is further configured to:
    perform at least one of a primitive assembly operation or a vertex transformation operation on the set of primitives for the draw call operation, wherein the identification of the subset of primitives is based on the performance of at least one of the primitive assembly operation or the vertex transformation operation.

14. The apparatus of claim 1, wherein the at least one processor is further configured to:

perform, based on the performance of the clipping operation, at least one of a viewport transform operation, a triangle setup operation, or a rasterization operation for each of the subset of primitives based on the area of each of the subset of primitives being greater than the area threshold.

15. The apparatus of claim 1, wherein each of the subset of primitives includes the primitive portion that is outside of the viewing frustum in a Z-direction.

16. The apparatus of claim 1, wherein the viewing frustum intersects each of the subset of primitives, and wherein a portion of each of the subset of primitives is within the viewing frustum.

17. The apparatus of claim 1, further comprising at least one of an antenna or a transceiver coupled to the at least one processor, wherein to obtain the indication of the set of primitives for the draw call operation, the at least one processor is configured to: obtain, via at least one of the antenna or the transceiver, the indication of the set of primitives for the draw call operation.

18. A method of graphics processing, comprising:

obtaining an indication of a set of primitives for a draw call operation;

identifying a subset of primitives in the set of primitives, wherein each of the subset of primitives include a primitive portion that is outside of a viewing frustum for the draw call operation, and wherein the primitive portion corresponds to less than all of each of the subset of primitives;

calculating an area of each of the subset of primitives including the primitive portion that is outside of the viewing frustum; and performing, or refraining from performing, a clipping operation for each of the subset of primitives based on the area of each of the subset of primitives being less than, equal to, or greater than an area threshold, wherein performance or refrainment from performance of the clipping operation is based on a per-draw call basis, and wherein the performance of the clipping operation for each of the subset of primitives is based on the area of each of the subset of primitives being greater than the area threshold on the per-draw call basis.

19. The method of claim 18, further comprising:

outputting an indication of the performance, or the refrainment from performance, of the clipping operation for each of the subset of primitives.

20. The method of claim 19, wherein outputting the indication of the performance, or the refrainment from performance, of the clipping operation for each of the subset of primitives comprises:

transmitting the indication of the performance, or the refrainment from performance, of the clipping operation for each of the subset of primitives; or storing the indication of the performance, or the refrainment from performance, of the clipping operation for each of the subset of primitives.

21. The method of claim 18, wherein performing the clipping operation for each of the subset of primitives comprises: performing the clipping operation for each of the subset of primitives based on the area of each of the subset of primitives being greater than the area threshold.

22. The method of claim 18, wherein refraining from performing the clipping operation for each of the subset of primitives comprises: refraining from performing the clipping operation for each of the subset of primitives based on the area of each of the subset of primitives being less than or equal to the area threshold.

23. The method of claim 18, further comprising:

detecting whether the area of each of the subset of primitives is less than, equal to, or greater than the area threshold, wherein the performance, or the refrainment from performance, of the clipping operation for each of the subset of primitives is based on the detection.

24. The method of claim 18, further comprising:

calculating, for each of the subset of primitives including the area of the primitive that is less than the area threshold, a Z-value for each pixel in the primitive.

25. The method of claim 24, further comprising:

discarding, based on the calculation of the Z-value, each pixel in the primitive including the Z-value that is outside of a Z-value range; or performing, based on the calculation of the Z-value, a shading operation for each pixel in the primitive including the Z-value that is within the Z-value range.

26. The method of claim 25, further comprising:

outputting an indication of the performance of the shading operation for each pixel in the primitive including the Z-value that is within the Z-value range;

wherein outputting the indication of the performance of the shading operation for each pixel in the primitive including the Z-value that is within the Z-value range comprises:

transmitting the indication of the performance of the shading operation for each pixel in the primitive including the Z-value that is within the Z-value range; or storing the indication of the performance of the shading operation for each pixel in the primitive including the Z-value that is within the Z-value range; and wherein calculating the Z-value for each pixel in the primitive comprises: performing a Z-test for each pixel in the primitive.

27. The method of claim 18, further comprising:

performing at least one of a primitive assembly operation or a vertex transformation operation on the set of primitives for the draw call operation, wherein the identification of the subset of primitives is based on the performance of at least one of the primitive assembly operation or the vertex transformation operation; and performing, based on the performance of the clipping operation, at least one of a viewport transform operation, a triangle setup operation, or a rasterization operation for each of the subset of primitives based on the area of each of the subset of primitives being greater than the area threshold.

28. An apparatus for graphics processing, comprising:

means for obtaining an indication of a set of primitives for a draw call operation;

means for identifying a subset of primitives in the set of primitives, wherein each of the subset of primitives include a primitive portion that is outside of a viewing frustum for the draw call operation, and wherein the primitive portion corresponds to less than all of each of the subset of primitives;

means for calculating an area of each of the subset of primitives including the primitive portion that is outside of the viewing frustum; and means for performing, or refraining from performing, a clipping operation for each of the subset of primitives based on the area of each of the subset of primitives being less than, equal to, or greater than an area threshold, wherein performance or refrainment from performance of the clipping operation is based on a per-draw call basis, and wherein the performance of the clipping operation for each of the subset of primitives is based on the area of each of the subset of primitives being greater than the area threshold on the per-draw call basis.

29. A non-transitory computer-readable medium storing computer executable code for graphics processing, the code when executed by at least one processor causes the at least one processor to:

obtain an indication of a set of primitives for a draw call operation;

identify a subset of primitives in the set of primitives, wherein each of the subset of primitives include a primitive portion that is outside of a viewing frustum for the draw call operation, and wherein the primitive portion corresponds to less than all of each of the subset of primitives;

calculate an area of each of the subset of primitives including the primitive portion that is outside of the viewing frustum; and perform, or refrain from performing, a clipping operation for each of the subset of primitives based on the area of each of the subset of primitives being less than, equal to, or greater than an area threshold, wherein performance or refrainment from performance of the clipping operation is based on a per-draw call basis, and wherein the performance of the clipping operation for each of the subset of primitives is based on the area of each of the subset of primitives being greater than the area threshold on the per-draw call basis.

* * * * *